US012533584B2

(12) United States Patent
Uematsu et al.

(10) Patent No.: US 12,533,584 B2
(45) Date of Patent: Jan. 27, 2026

(54) STORAGE MEDIUM, INFORMATION PROCESSING APPARATUS, INFORMATION PROCESSING SYSTEM AND GAME PROCESS METHOD

(71) Applicant: NINTENDO CO., LTD., Kyoto (JP)

(72) Inventors: Haruya Uematsu, Kyoto (JP); Naoki Fukada, Kyoto (JP); Yuya Sato, Kyoto (JP); Ryuju Maeno, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 363 days.

(21) Appl. No.: 18/303,900

(22) Filed: Apr. 20, 2023

(65) Prior Publication Data

US 2023/0277932 A1 Sep. 7, 2023

Related U.S. Application Data

(63) Continuation of application No. PCT/JP2022/009230, filed on Mar. 3, 2022.

(51) Int. Cl.
*A63F 13/00* (2014.01)
*A63F 13/52* (2014.01)
(Continued)

(52) U.S. Cl.
CPC ............ *A63F 13/533* (2014.09); *A63F 13/52* (2014.09); *A63F 13/537* (2014.09); *A63F 13/69* (2014.09)

(58) Field of Classification Search
CPC ................................ A63F 13/45; A63F 13/52
See application file for complete search history.

(56) References Cited

U.S. PATENT DOCUMENTS

2006/0160596 A1* 7/2006 Sato .................... G07F 17/3286 463/16
2007/0293317 A1* 12/2007 Sato ...................... A63F 13/812 463/37

(Continued)

FOREIGN PATENT DOCUMENTS

JP 2007-527765 10/2007
JP 5978530 8/2016

(Continued)

OTHER PUBLICATIONS

May 17, 2022 International Search Report issued in International Patent Application No. PCT/JP2022/009230, [machine translation included]; pp. 1-4.

(Continued)

*Primary Examiner* — David L Lewis
*Assistant Examiner* — Eric M Thomas
(74) *Attorney, Agent, or Firm* — Nixon & Vanderhye PC

(57) ABSTRACT

An example of an information processing apparatus displays, on a display device, a game image including a virtual game field where a player character is placed. The information processing apparatus generates a unified equipment object based on an equipment object and a material object, wherein the unified equipment object has an external appearance obtained by unifying together the equipment object and the material object. When a unification instruction is given while in a state where the display device is displaying a scene where the player character equipped with an equipment object and a material object are placed on the game field, the information processing apparatus generates the unified equipment object; and the information processing apparatus updates the game image so as to make the material object disappear and change the equipment object equipped on the player character to the unified equipment object.

32 Claims, 27 Drawing Sheets

(51) Int. Cl.

| | |
|---|---|
| ***A63F 13/533*** | (2014.01) |
| ***A63F 13/537*** | (2014.01) |
| ***A63F 13/69*** | (2014.01) |

(56) References Cited

U.S. PATENT DOCUMENTS

| | | | |
|---|---|---|---|
| 2013/0324200 | A1 | 12/2013 | Okamura et al. |
| 2020/0360806 | A1 | 11/2020 | Sun |
| 2021/0187396 | A1 | 6/2021 | Sakamoto |

FOREIGN PATENT DOCUMENTS

| | | |
|---|---|---|
| JP | 2021-100470 | 7/2021 |
| WO | 2005/086602 | 9/2005 |

OTHER PUBLICATIONS

PUBG Season; Overview of the latest patch note information The appearance of new items that puncture vehicles and the update of "Vikendi", e-SPORTS PRESS [online], Nov. 14, 2019, internet <URL:https://e-sports-press.com/archives/21355>, [retrieved on May 9, 2022]; pp. 1-10.

PUBG Mobile; Mechanism in armory, Method of getting and equipping weapons & airplane skins?, AppBank [online], Jun. 20, 2018, internet <URL:https://www.appbank.net/2018/06/20/iphone-application/1567074.php>, [retrieved on May 9, 2022]; pp. 1-8.

The release of "Fallout 4(Fallout 4)" is finally approaching, Delivering the first impression of the Japanese version! famitsu.com [online], Nov. 30, 2015, internet <URL:https://www.famitsu.com/news/201511/30094174.html> [retrieved on May 9, 2022]; pp. 1-9.

* cited by examiner

Fig. 11

| | MATERIAL 1 | MATERIAL 2 | ··· | MATERIAL n |
|---|---|---|---|---|
| EQUIPMENT A | UNIFIED EQUIPMENT A1 | UNIFIED EQUIPMENT A2 | ··· | UNIFIED EQUIPMENT An |
| EQUIPMENT B | UNIFIED EQUIPMENT B1 | UNIFIED EQUIPMENT B2 | ··· | UNIFIED EQUIPMENT Bn |
| ⋮ | ⋮ | ⋮ | | ⋮ |
| EQUIPMENT Z | UNIFIED EQUIPMENT Z1 | UNIFIED EQUIPMENT Z2 | ··· | UNIFIED EQUIPMENT Zn |

STORAGE MEDIUM, INFORMATION PROCESSING APPARATUS, INFORMATION PROCESSING SYSTEM AND GAME PROCESS METHOD

CROSS REFERENCE TO RELATED APPLICATION

This application is a continuation of International Patent Application PCT/JP2022/009230 filed on Mar. 3, 2022, the entire contents of which is incorporated herein by reference.

FIELD

The present disclosure relates to a storage medium, an information processing apparatus, an information processing system and a game process method for controlling a player character.

BACKGROUND AND SUMMARY

There are conventional video games in which the player controls a character to perform an attack action using a weapon such as a sword.

In some games in which a player character uses equipment such as a weapon, a piece of equipment can be synthesized with another material to generate a new piece of equipment. In conventional games, such equipment synthesis is done, for example, as the player character talks to a blacksmith character in the game, in response to which a menu screen is displayed for selecting equipment and a material to be synthesized. On the menu screen, the player selects a piece of equipment and a material. Thus, equipment synthesis is done on a menu screen. Therefore, when the player character equipped with the synthesized equipment is displayed thereafter, it may be difficult for the player to know the relationship between the synthesized equipment and the base objects (i.e., a piece of equipment and a material before they are synthesized together).

Therefore, the present application discloses a storage medium, an information processing apparatus, an information processing system and a game process method, with which the relationship between equipment and the base objects used for the generation thereof can be presented to the player in an easy-to-understand manner (1) An example of a non-transitory computer-readable storage medium stores a game program to be executed by a processor in an information processing apparatus. The game program causes the processor to execute: displaying, on a display device, a game image including a virtual game field where a player character controlled by a player is placed; and generating a unified equipment object based on an equipment object that is equipable on the player character and a material object, wherein the unified equipment object has an external appearance obtained by unifying together the equipment object and the material object. When a unification instruction is given by the player while in a state where the display device is displaying a scene where the player character equipped with an equipment object and a material object are placed on the game field, the processor generates a unified equipment object based on the equipment object equipped on the player character and the material object placed on the game field; and the processor updates the game image so as to make the material object placed on the game field disappear and change the equipment object equipped on the player character on the game field to the unified equipment object.

With configuration (1) above, the game image is updated so as to make the material object in the game field disappear and change the equipment object equipped on the player character. Thus, the relationship between a new equipment object (i.e., a unified equipment object) and the base objects used for the generation thereof can be presented to the player in an easy-to-understand manner (2) The processor may generate a unified equipment object by using an equipment object placed on the game field as a material object.

With configuration (2) above, an equipment object in the game field can be given two different uses, i.e., using it as it is by equipping it on the player character as an equipment object, and using it as a material object for generating a unified equipment object, thereby improving the strategic aspect of the game.

(3) The processor may generate a unified equipment object for any of combinations between material objects that is usable in generation of unified equipment objects and equipment objects that is usable in generation of unified equipment objects.

With configuration (3) above, it is easy for the player to know what combinations between equipment objects and material objects can be used for generating unified equipment objects.

(4) The game program may cause the processor to further execute: when a predetermined condition is satisfied, making the unified equipment object disappear, and making a base equipment object of the unified equipment object appear in the game without making a base material object of the unified equipment object appear in the game.

With configuration (4) above, it is possible to reduce the possibility that a material object may be moved to a place that is different from where it is placed in the first place in the game field, thereby hindering the progress of the game.

(5) The game program may cause the processor to further execute: if an equipment durability value assigned to the unified equipment object indicates that a durability has exhausted, making the unified equipment object disappear, without making a base equipment object and a base material object of the unified equipment object appear in the game.

With configuration (5) above, it is possible to motivate the player to repeatedly generate unified equipment objects in the game.

(6) The player character may be able to carry around an object that is stored by the player character in the game field. The processor may generate a unified equipment object by using, as a material object, an unstorable object that is not settable in a state of being stored by the player character. The game program may cause the processor to further execute: setting a unified equipment object in a state of being stored by the player character.

With configuration (6) above, by also using unstorable objects as material objects, it is possible to increase the types of material objects and can generate a wider variety of unified equipment objects. Even if an unstorable object is used as a material object, the player character can store a unified equipment object (that is, there is never a case where the player cannot store, and has to discard, unified equipment objects; rather, the player can save them). Therefore, the player can generate unified equipment objects without hesitation.

(7) The equipment object may include a projectile object and a projectile weapon object configured to shoot the projectile object. When the unification instruction is given while in a state where the player character is ready to shoot the projectile object with the projectile weapon object and where one of the material objects stored by the player character is being selected, the processor may generate a unified projectile object that represents a projectile obtained by unifying together the projectile object and the selected material object. The processor may update the game image so as to change the projectile object, of the equipment objects equipped on the player character on the game field, to the unified projectile object. The unified projectile object may be unsettable in a state of being stored by the player character.

Since a projectile object is typically shot when used, and cannot therefore be used continuously like a sword. Therefore, if a plurality of unified projectile objects are needed for a single battle event, or the like, and if the user needs to generate unified projectile objects from material objects and projectile objects placed on the game field for each battle event, the user may feel inconvenience. For this, with configuration (7) above, since material objects stored by the player character can be used directly in the unification process, and the player can therefore easily perform the operation of controlling the player character to shoot using a unified projectile object based on a projectile object. Since unified projectile objects are not stored by the player character, the user needs to generate a unified projectile object as needed. Therefore, it is possible to reduce the possibility of pushing the data capacity as the user may excessively generate, in advance, unified projectile objects from a large number of projectile objects and/or many types of projectile objects and many types of material objects, and it is also possible to maintain the feel of tension during a battle event, or the like.

(8) The game program may cause the processor to further execute: assigning a material durability value to a unified equipment object that is based on a material object assigned a durability value; and if the material durability value assigned to a unified equipment object equipped on the player character indicates that a durability has exhausted, making the unified equipment object disappear and generating a base equipment object of the unified equipment object.

With configuration (8) above, the unified equipment object can take over a property of the material object (i.e., the property of having a durability value). Therefore, if a unified equipment is based on a material having a durability value, the player can reasonably predict that the unified equipment will be changed to the base equipment object depending on the durability.

(9) The material object may be a switch function object capable of taking an active state in which a predetermined function of the material object is exerted in the game field and an inactive state in which the predetermined function is not exerted in the game field. The game program may cause the processor to further execute: controlling the unified equipment object to exert the predetermined function in response to the player character performing a predetermined action using a unified equipment object based on the switch function object.

With configuration (9) above, the player can control the player character to perform a predetermined action so as to control the unified equipment object to exert the function at a desired point in time.

(10) The material object may be a propulsion object that has a function of generating propulsion. The game program may cause the processor to further execute: when the player character is equipped with a unified equipment object based on the propulsion object, generating propulsion to at least one of the unified equipment object and the player character so as to move the player character in the game field.

With configuration (10) above, the unified equipment object can be given a function different from the original function of the equipment object.

(11) The unified equipment object may have an external appearance including at least a portion of an external appearance of a base equipment object of the unified equipment object and at least a portion of an external appearance of a base material object of the unified equipment object.

With configuration (11) above, based on the external appearance of the unified equipment object, the base equipment object and the base material object of the unified equipment object can be recognized easily by the player.

(12) The unified equipment object may have an external appearance obtained by replacing a portion of an external appearance of a base equipment object of the unified equipment object with a portion or whole of an external appearance of a base material object of the unified equipment object.

With configuration (12) above, the player can easily guess the external appearance of the unified equipment object from the external appearance of the base equipment object and the external appearance of the base material object.

(13) The unified equipment object may have an external appearance obtained by replacing a portion of an external appearance of a base equipment object of the unified equipment object with a portion or whole of an external appearance of a shrunk version of a base material object of the unified equipment object.

With configuration (13) above, as with configuration (12) above, the player can easily guess the external appearance of the unified equipment object from the external appearance of the base equipment object and the external appearance of the base material object. With configuration (13) above, it is possible to reduce the possibility that it may become hard to see the player character and other objects being blocked by the unified equipment object.

(14) A first equipment object may include a projectile object and a projectile weapon object configured to shoot the projectile object. The processor may generate a unified projectile object that represents a projectile obtained by unifying together a projectile object included in the first equipment object and a predetermined material object. The unified projectile object may have an external appearance obtained by replacing a portion of an external appearance of the base projectile object of the unified projectile object with a portion or whole of an external appearance of the predetermined base material object of the unified projectile object. A unified equipment object generated based on a second equipment object that does not include the projectile object and the predetermined material object may have an external appearance obtained by replacing a portion of an external appearance of the second equipment object with a portion or whole of an external appearance of a shrunk version of the predetermined material object.

With configuration (14) above, it is possible to reduce the possibility that it may become hard to see other characters and objects being blocked by the unified equipment object. In a case where a unified projectile object is placed on the game field, it is possible to reduce the possibility that the player may see the external appearance portion of the base material object of the unified projectile object and erroneously think that a material object whose size is different from that of a normal material object.

(15) When the unification instruction is given while in a state where the display device is displaying a scene where the player character equipped with an equipment object and a material object are placed on the game field, the processor may update the game image so as to move the material object closer to the player character and then change the equipment object equipped on the player character to a unified equipment object.

With configuration (15) above, the base equipment object and the base material object used for the generation of the unified equipment object can be presented to the player in an easy-to-understand manner

(16) The processor may generate a unified equipment object based on a material object, from among material objects placed on the game field, that is within a predetermined distance from a position of the player character or a position of an equipment object equipped on the player character.

With configuration (16) above, it is possible to limit the material objects that can be used for the generation of unified equipment objects, and it is therefore possible to reduce the possibility that the player is allowed to use any material objects with no limitation for the generation of unified equipment objects, thus destroying the game balance.

(17) The processor may generate a unified equipment object based on the equipment object equipped on the player character and one of material objects placed within a certain range in the game field that is determined based on a position of the player character or the equipment object and a direction of the player character or the equipment object.

With configuration (17) above, it is possible to generate a unified equipment object based on a material object that is at a position easy to recognize for the player.

(18) The game program may cause the processor to further execute: in a state where the display device is displaying a scene in which the player character equipped with an equipment object and one or more material objects are placed on the game field, adding a specification image to one of the material objects that satisfies a predetermined criterion.

With configuration (18) above, in a state where a game image representing the game field is displayed, the base material object of the unified equipment object can be presented to the player in an easy-to-understand manner

(19) The player character may be able to be simultaneously equipped with a plurality of equipment objects. The processor may generate a unified equipment object based on a material object and one of a plurality of equipment objects being equipped on the player character that is specified by the player.

With configuration (19) above, where the player character is equipped with a plurality of equipment objects, it is possible to generate a unified equipment object based on equipment objects specified by the player.

(20) The game program may cause the processor to further execute: making the player character perform an action of holding ready one of a plurality of equipment objects being equipped on the player character, wherein the one of the plurality of equipment objects is specified by the player. The processor may generate a unified equipment object based on an equipment object that the player character is holding ready and a material object.

With configuration (20) above, in a case where the player character is equipped with a plurality of equipment objects, the operation for generating a unified equipment object can be made easier for the player.

(21) The game program may cause the processor to further execute: in a state where the display device is displaying a scene in which the player character equipped with an equipment object and a material object are placed on the game field, displaying, on the display device, a specification image that associates together the equipment object equipped on the player character and the material object. When the unification instruction is given while in a state where the specification image is displayed, the processor may generate a unified equipment object based on the equipment object and the material object that are associated together by the specification image.

With configuration (21) above, the base equipment object and the base material object of the unified equipment object can be presented to the player in an easy-to-understand manner

(22) The game program may cause the processor to further execute: displaying an image of choices representing the plurality of equipment objects on the display device when a material object is arranged within a predetermined distance from a position of the player character and when the unified equipment object is able to be generated. The processor may generate a unified equipment object based on a material object and one equipment object that is specified by the player from among the choices.

With configuration (22) above, where the player character is equipped with a plurality of equipment objects, the operation for generating a unified equipment object can be made easier for the player.

(23) The game program may cause the processor to further execute: displaying a specification image that associates together the player character and the material object on the display device in a state where a scene where the player character and the material object are placed on the game field is displayed on the display device. When the unification instruction is given in a state where the specification image is displayed, the processor may generate a unified equipment object based on the equipment object and the material object that are associated together by the specification image.

With configuration (22) above, the base material object of the unified equipment object can be presented to the player in an easy-to-understand manner

(24) The game program may cause the processor to further execute: when a gluing instruction is given by the player while in a state where a plurality of material objects are placed on the game field, placing, on the game field, a glued object obtained by gluing together the material objects.

With configuration (24) above, material objects placed on the game field can also be used in the gluing process, thereby expanding the usability of material objects in the game. This extends the strategic aspect and the playability of the game using material objects.

(25) When the gluing instruction is given while in a state where a plurality of objects including an equipment object are placed on the game field, the processor may place, on the game field, a glued object obtained by gluing together the equipment object and another object.

With configuration (25) above, equipment objects placed on the game field can also be used in the gluing process, thereby expanding the usability of equipment objects in the game. This extends the strategic aspect and the playability of the game using equipment objects.

(26) The processor may place, on the game field, a new glued object obtained by gluing together a glued object, which is obtained by gluing together a plurality of material objects, and a material object placed on the game field. The processor does not need to generate a unified equipment object based on a unified equipment object equipped on the player character and a material object placed on the game field.

With configuration (26) above, it is possible to prevent the number of combinations between equipment objects and material objects, with which unified equipment objects can be generated, from becoming too large.

(27) The glued object may be splittable into base objects thereof in response to a release instruction given by the player. The unified equipment object may be unsplittable into a base equipment object and a base material object thereof in response to an instruction given by the player.

With configuration (27) above, it is possible to improve the degree of freedom of the gluing process, and to reduce the possibility that a base material object of a unified equipment object may be moved to a place that is different from where it is placed in the first place in the game field, thereby hindering the progress of the game.

(28) The processor may generate the unified equipment object by securing together an equipment object and a material object in a predetermined positional relationship. The processor may generate the glued object by securing together material objects in a positional relationship that is determined based on a position and attitude of each material object at the time of gluing.

With configuration (28) above, the external appearance of a unified equipment object for a particular combination of an equipment object and a material object does not vary, and it is easy for the player to guess the external appearance of a unified equipment object. It is possible to increase the variation of glued objects.

(29) The game program may cause the processor to further execute: placing, on the game field, a character that is a non-player character not controlled by the player and that is equipped with a unified equipment object.

With configuration (29) above, the player can observe the equipment of the non-player character, and may discover a unified equipment object and the capability thereof. Therefore, it is possible to motivate the player to generate unified equipment objects.

Note that the present specification discloses an example of an information processing apparatus or an information processing system configured to execute the processes recited in (1) to (29) above. The present specification also discloses an example of a game process method for executing the processes recited in (1) to (29).

With the storage medium, the information processing apparatus, the information processing system or the game process method set forth above, the relationship between equipment and the base objects used for the generation thereof can be presented to the player in an easy-to-understand manner.

These and other objects, features, aspects and advantages of the present invention will become more apparent from the following detailed description of the present invention when taken in conjunction with the accompanying drawings.

BRIEF DESCRIPTION I/F THE DRAWINGS

FIG. 11 is a table showing an example of a relationship between the equipment object, the material object and the unified equipment object to be generated based on these objects;

DETAILED DESCRIPTION I/F NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
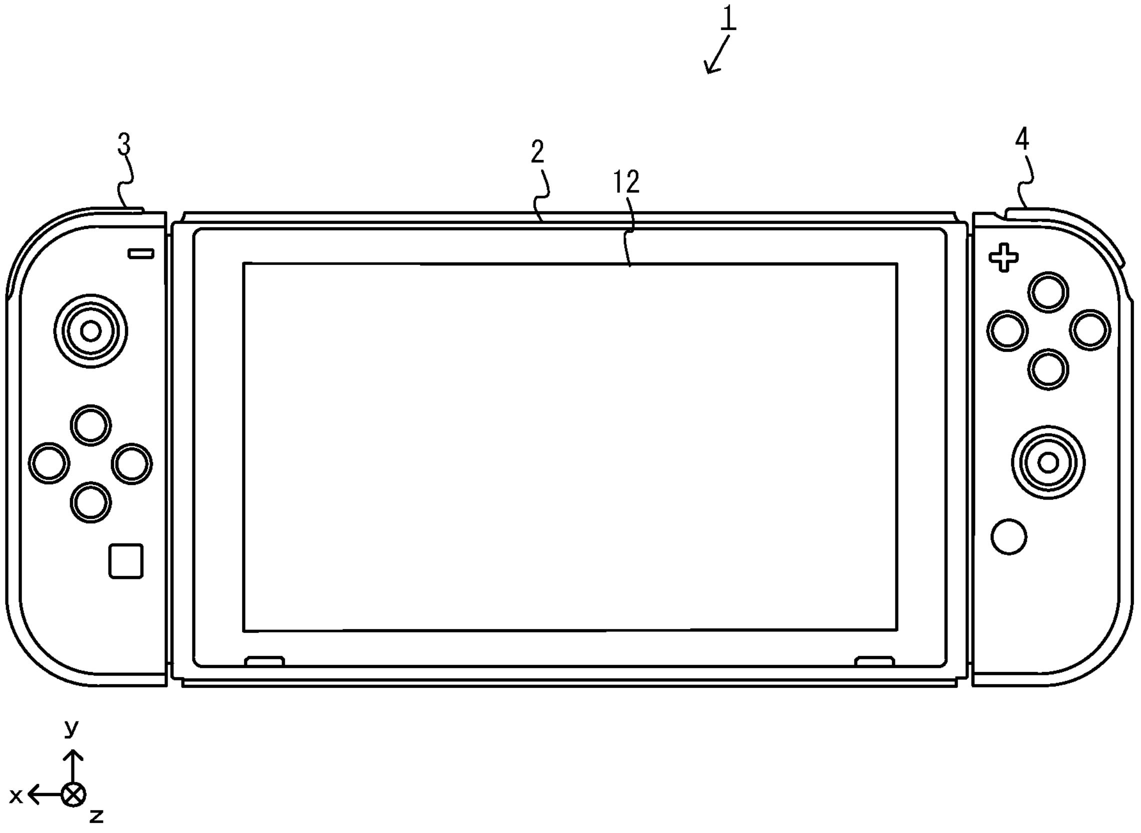
FIG. 1 is a view showing an example of a non-limiting main body unit with a non-limiting left controller and a non-limiting right controller attached thereto.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
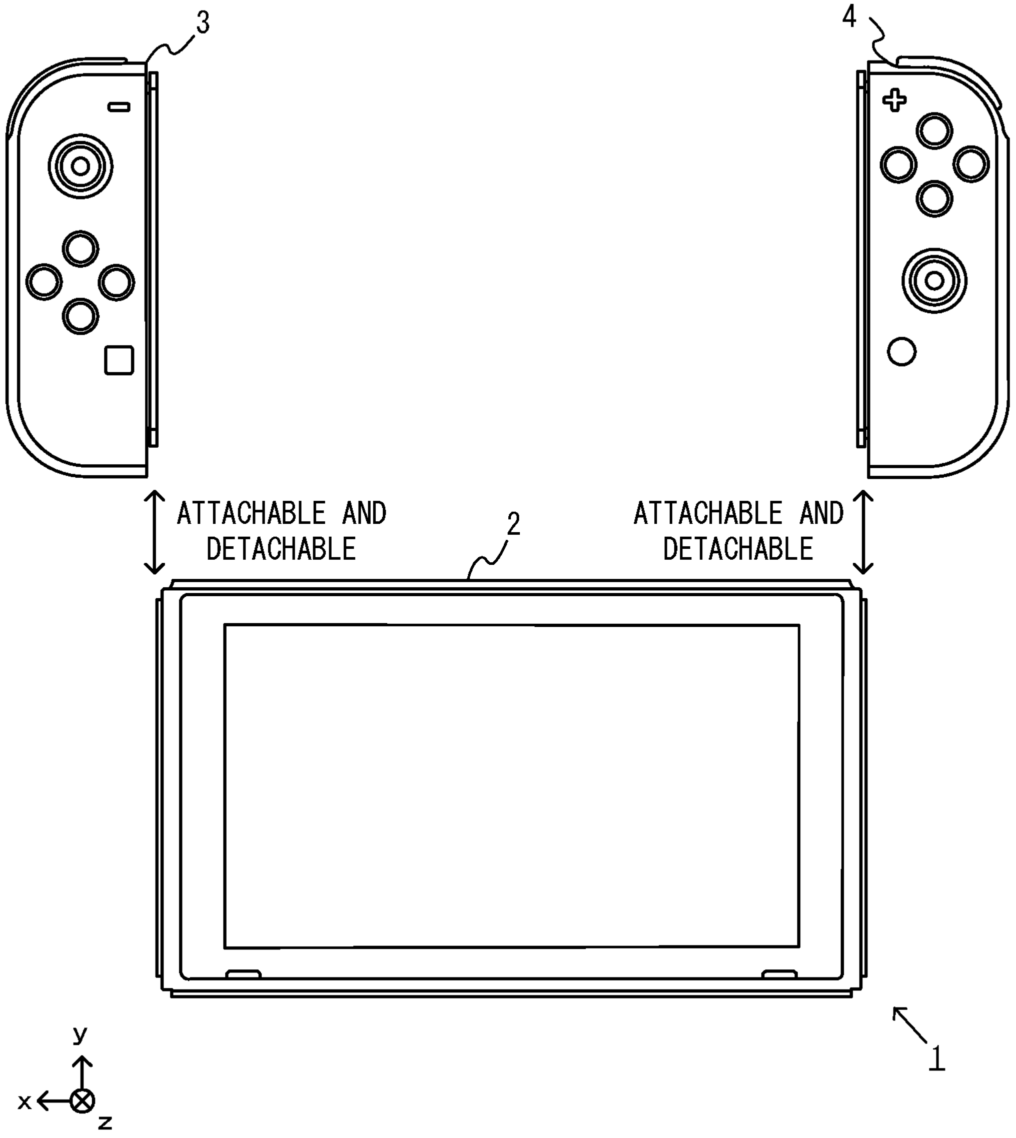
FIG. 2 is a view showing an example of the non-limiting main body unit with the non-limiting left controller and the non-limiting right controller removed therefrom.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
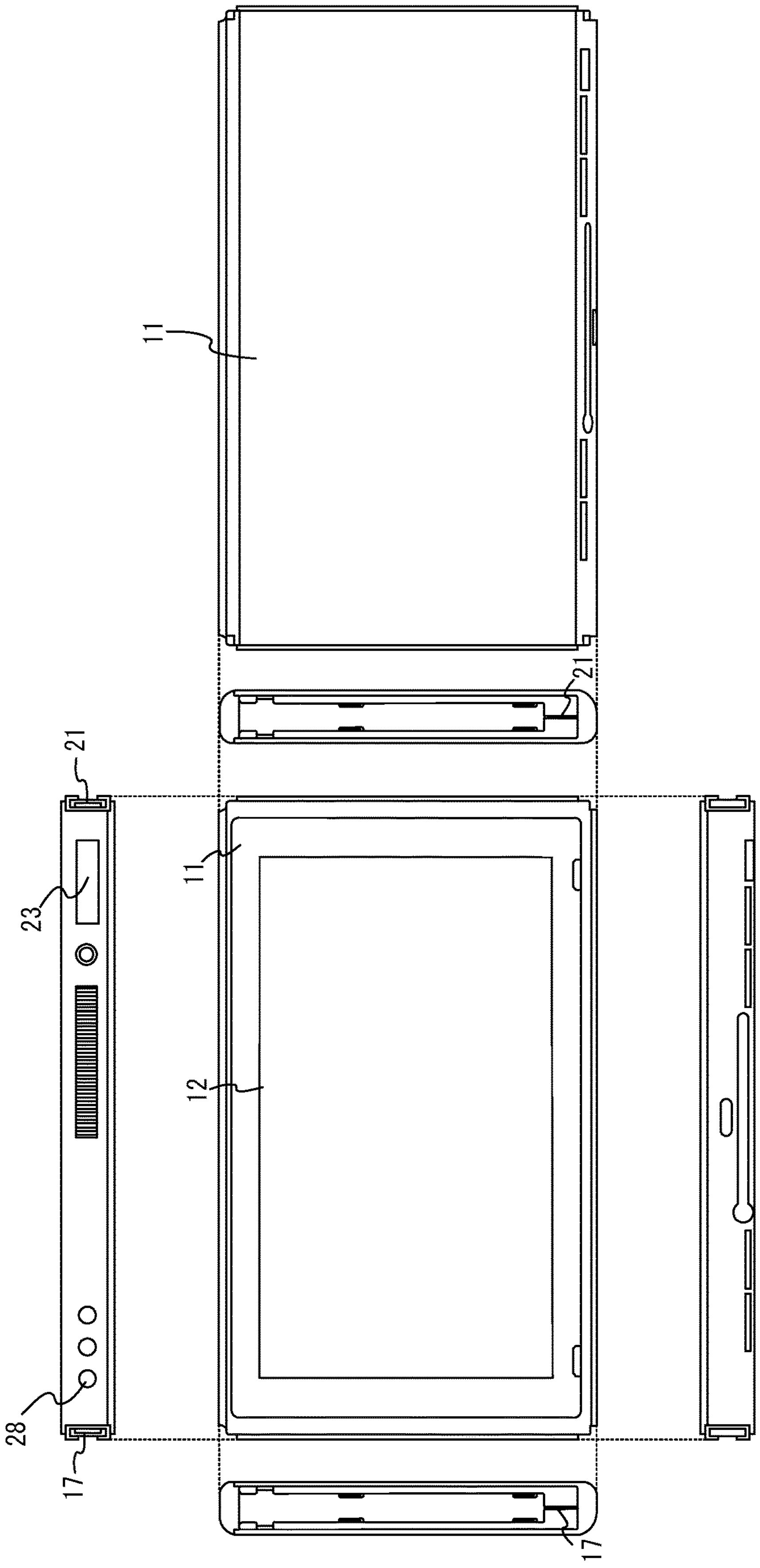
FIG. 3 is a six-sided view showing an example of the non-limiting main body unit.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 4:
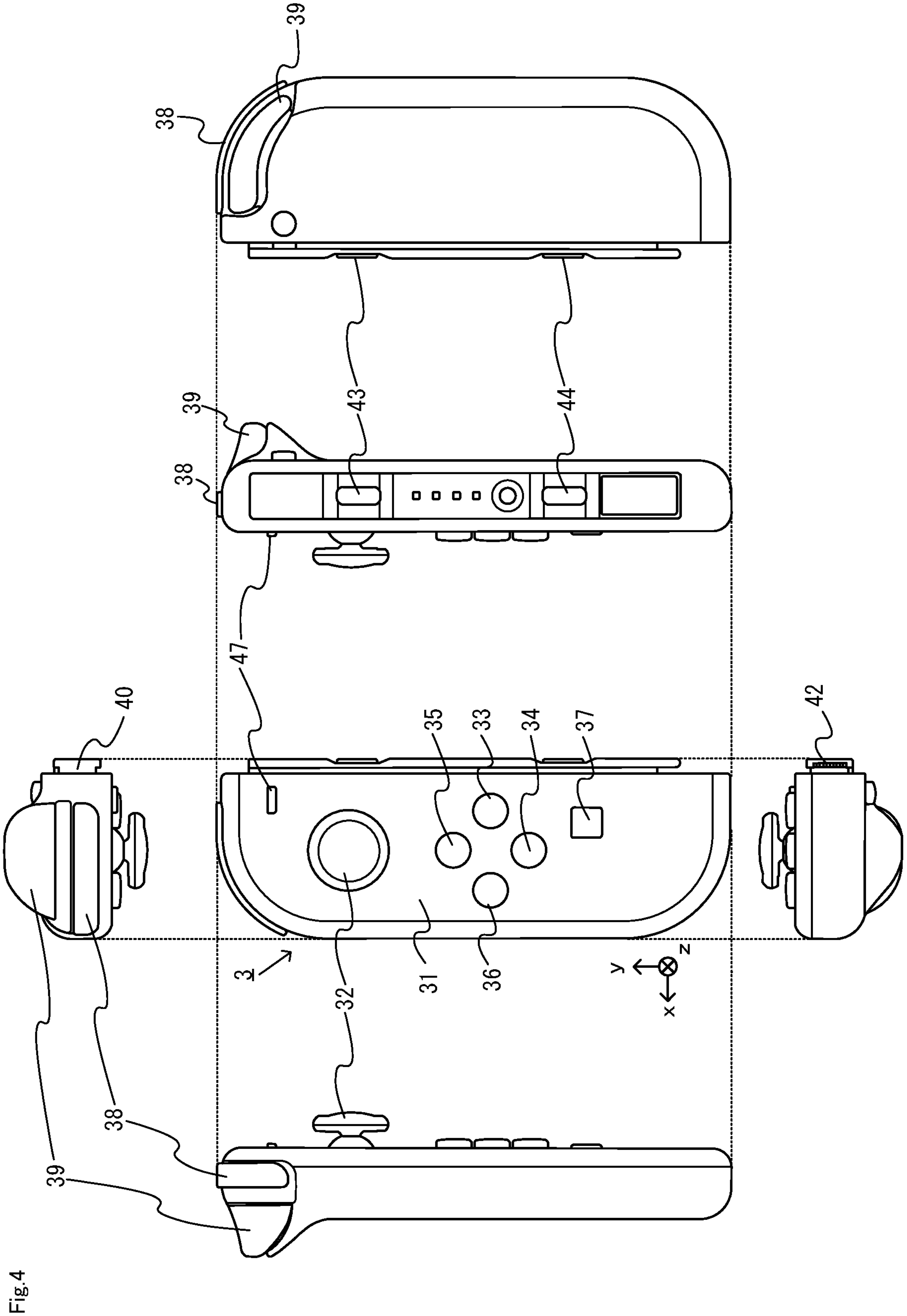
FIG. 4 is a six-sided view showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36

(specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
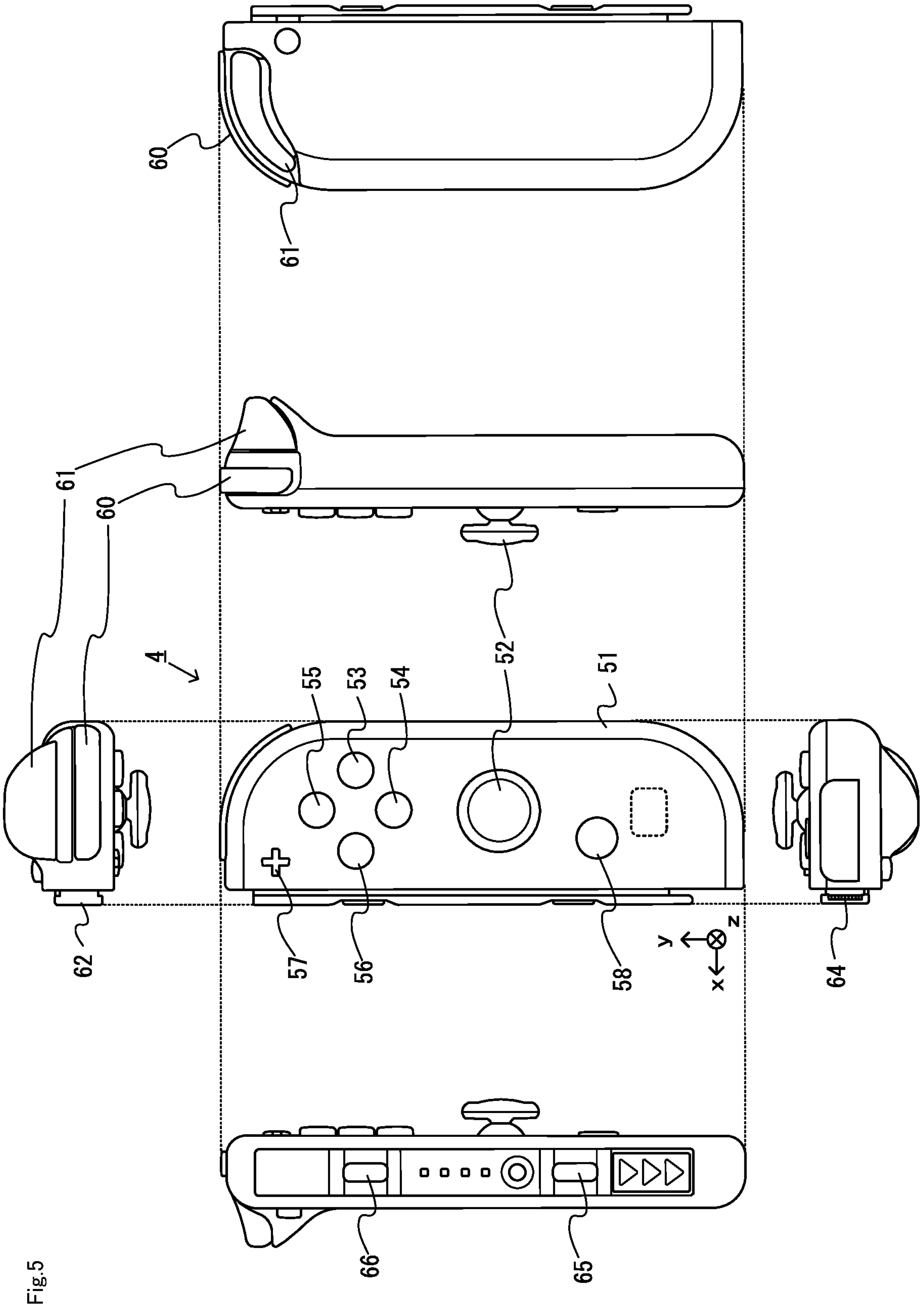
FIG. 5 is a six-sided view showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
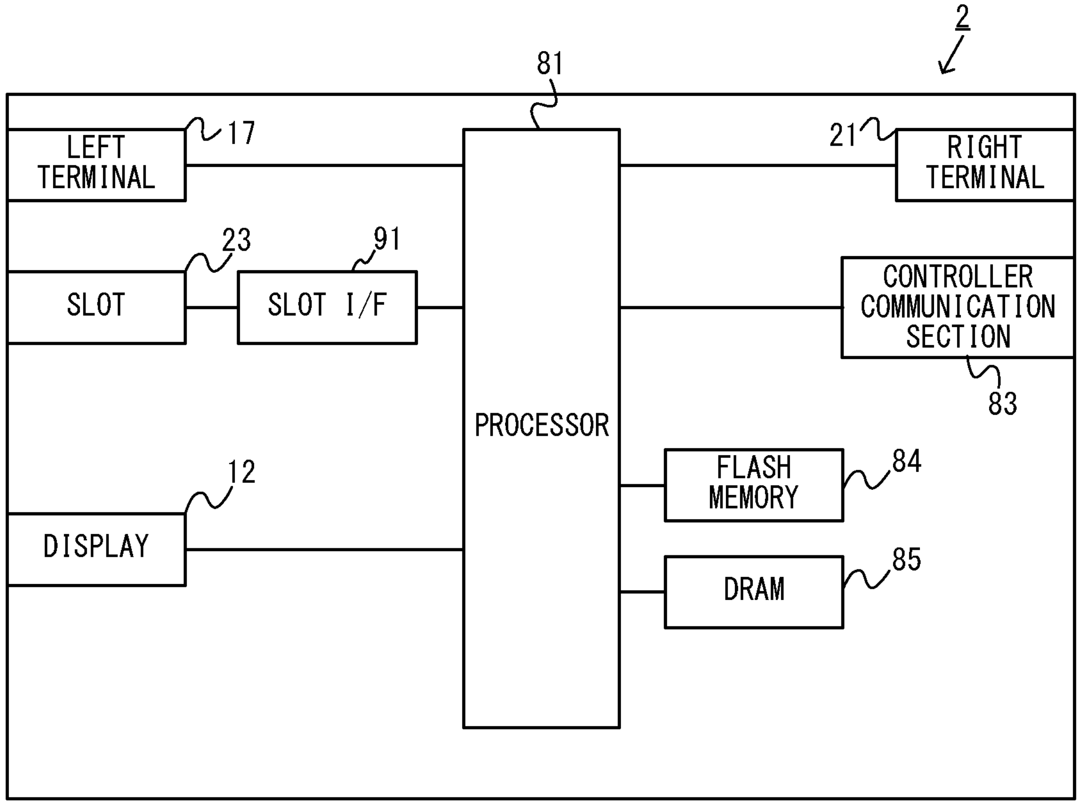
FIG. 6 is a block diagram showing an example of an internal configuration of the non-limiting main body unit.

FIG. 6 is a block diagram showing an example of the internal configuration of the main body apparatus 2. The main body apparatus 2 includes components 81, 83 to 85, and 91 shown in FIG. 6 in addition to the components shown in FIG. 3. Some of the components 81, 83 to 85, and 91 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. As described above, in the exemplary embodiment, the main body apparatus 2 can perform both wired communication and wireless communication with each of the left controller 3 and the right controller 4.

Further, the display 12 is connected to the processor 81. The processor 81 displays a generated image (e.g., an image generated by executing the above information processing) and/or an externally acquired image on the display 12.

Figure 7:
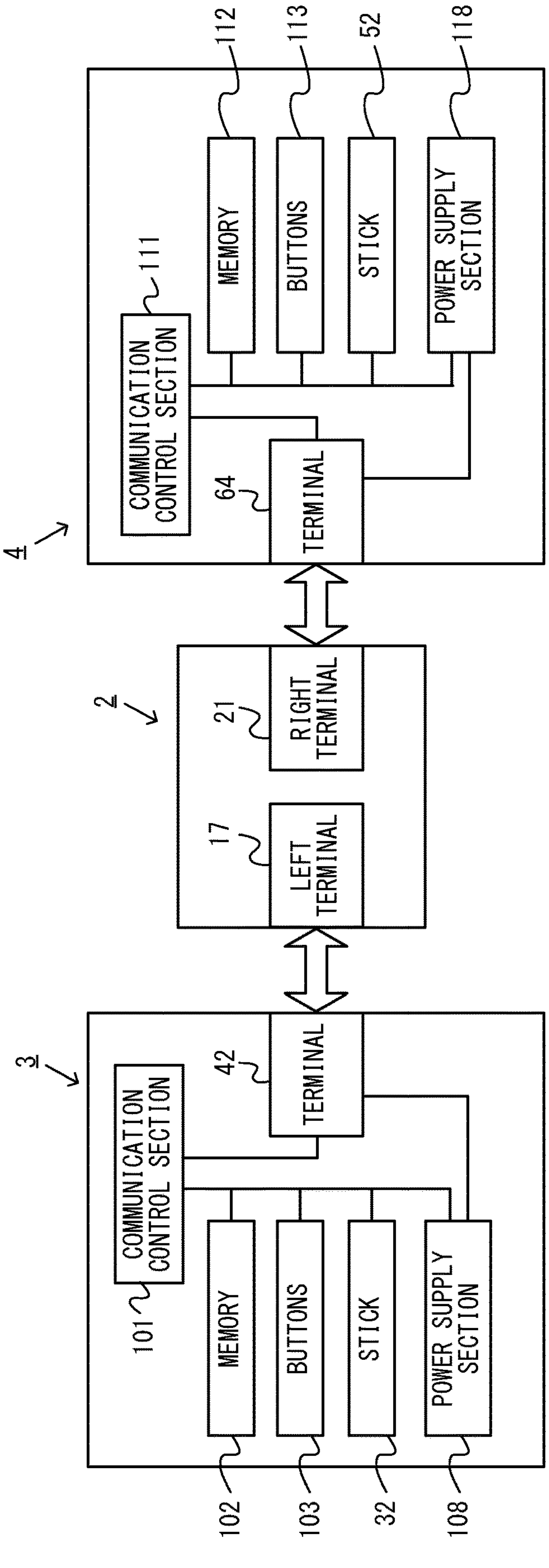
FIG. 7 is a block diagram showing an example of an internal configuration of the non-limiting main body unit and the non-limiting left controller and the non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal

42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Process in Game System

A game process executed on the game system 1 will now be outlined. In the present embodiment, the game system 1 executes a game process for a game in which the player (in other words, the user) controls a player character in a virtual game field. In the present embodiment, the game system 1 generates a new equipment object (referred to as a "unified equipment object") based on an equipment object that can be equipped on the player character and a material object.

In the present specification, the term "equipment object" refers to an equipment object (e.g., a sword, a shield or a bow and arrow) that can be equipped on the player character. The state where "a character is equipped with an equipment object" refers to a state where the character can perform an action using the equipment object (e.g., wield a sword, hold a shield ready, shoot an arrow with a bow, etc.). In the present embodiment, in a state where the player character is equipped with an equipment object, the player character can perform an action using the equipment object being equipped without the player specifying an equipment object to be newly equipped from among equipment objects of the same type as the equipment object being equipped (in the present embodiment, there are three types of a sword, a shield and a bow and arrow). In the present embodiment, in a state where the player character is equipped with an equipment object, the player character is equipped with at least a portion of the equipment object. That is, the player character holds an equipment object or carries an equipment object on the back (see FIG. 8, FIG. 13 and FIG. 16, etc.).

In the present specification, the term "material object" refers to an object that is used, together with an equipment object, to generate a unified equipment object. The unified equipment object is generated in exchange for the equipment object and the material object.

In the present specification, the term "unified equipment object" refers to an equipment object that has an external appearance obtained by unifying together an equipment object and a material object. To "unify one object with another object" means to combine together one object and another object into one object. A unified equipment object only needs to be a unified object of an equipment object and a material object on the external appearance, and it does not need to be an object obtained by actually unifying together an equipment object and a material object (specifically, a polygon model of a unified equipment object does not need to be a polygon model obtained by unifying together the polygon model of an equipment object and the polygon model of a material object).

To "generate a unified equipment object based on an equipment object and a material object" means that a unified equipment object that is determined by an equipment object and a material object is made to appear in the game in exchange for the equipment object and the material object, and it is not limited to generating the unified equipment object by unifying together the polygon model of the equipment object and the polygon model of the material object.

Note that the process of generating a unified equipment object is not limited to the process of unifying together an equipment object and a material object in the strict sense as described above. Nevertheless, in the present embodiment, since the process of generating a unified equipment object generates a unified equipment object whose external appearance is obtained by unifying together an equipment object and a material object, the process of generating a unified equipment object is referred to as the "unification process" in the present specification.

[2-1. Outline of Unification Process]

Figure 8:
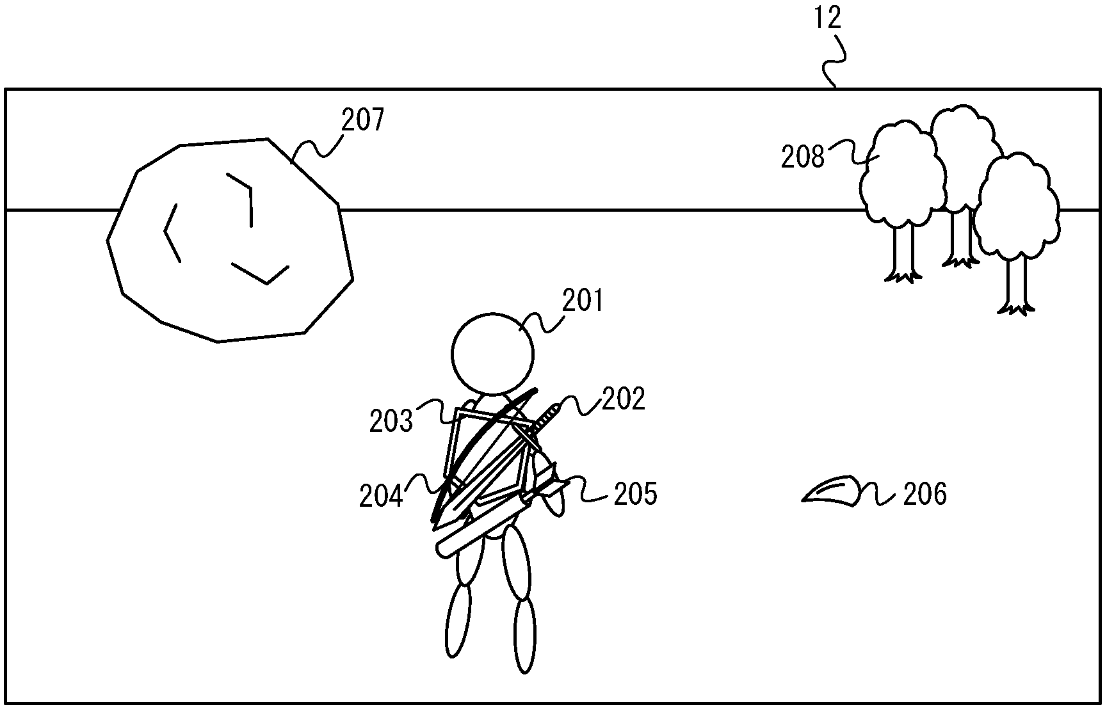
FIG. 8 is a view showing an example of a game image showing a game field in which a player character is placed.
Figure 9:
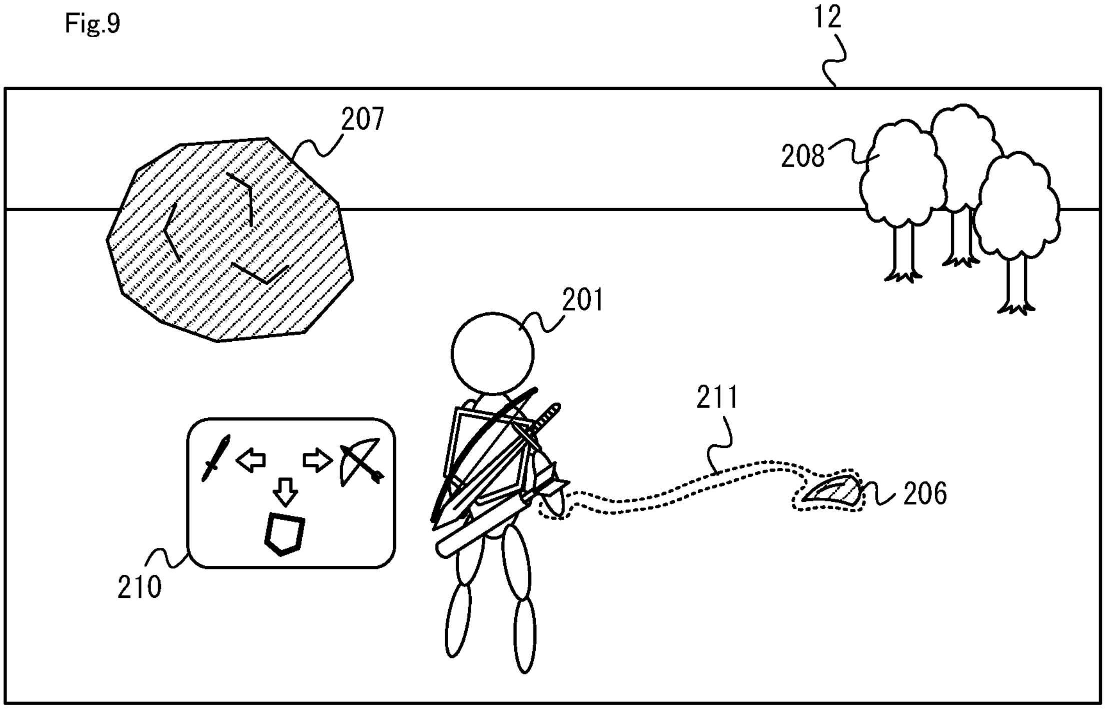
FIG. 9 is a view showing an example of a game image when a unification item is made usable for a player character.
Figure 10:
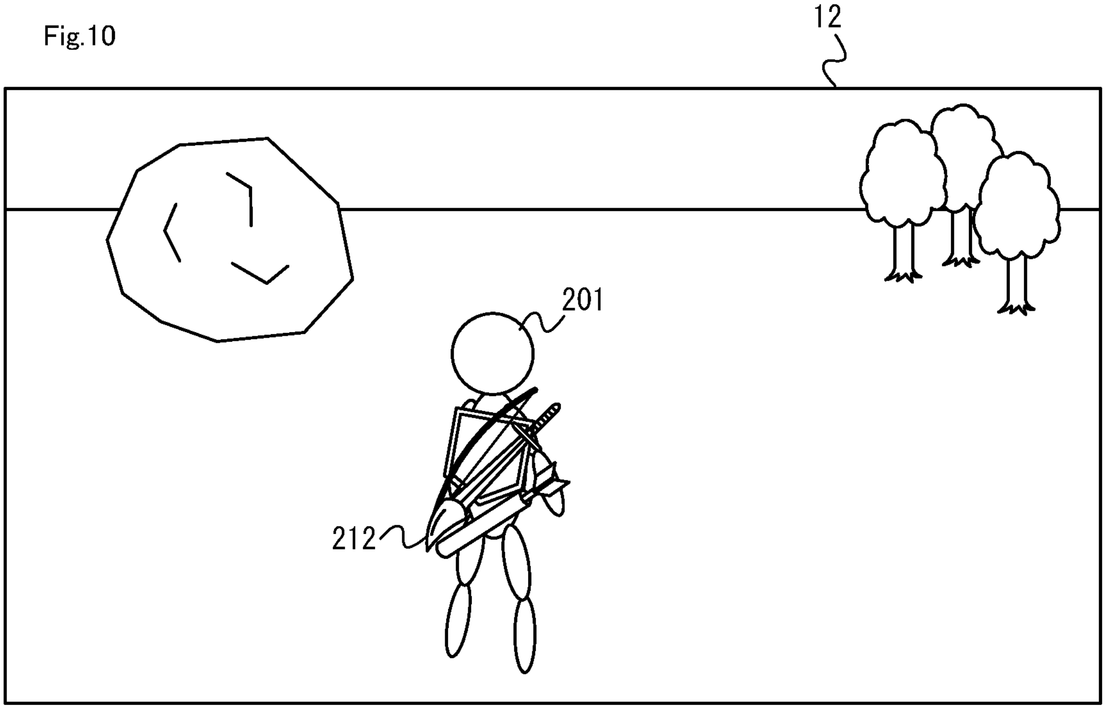
FIG. 10 is a view showing an example of a game image including a player character equipped with a unified equipment object generated.

Referring to FIG. 8 to FIG. 10, the unification process will be outlined. FIG. 8 is a view showing an example of a game image showing a game field in which a player character is placed. Note that while the game image is assumed to be displayed on a display 12 of a main body unit 2 in the present embodiment, the game image may be displayed on anther display device connected to the main body unit 2.

In the game image shown in FIG. 8, a player character 201 is equipped with a sword object 202, a shield object 203 and a bow and arrow object (specifically, a bow object 204 and an arrow object 205) as equipment objects. In the game image shown in FIG. 8, a tusk object 206, a rock object 207 and a tree object 208 are placed on the game field. The tusk object 206 represents a tusk of an enemy character (not shown), and is for example an object that is placed on the game field as a drop from the enemy character when the player character 201 defeats the enemy character. Note that the tusk object 206 and the rock object 207 are material objects, and the tree object 208 is not a material object.

In the present embodiment, the player character 201 can be simultaneously equipped with a plurality of equipment objects. Here, in the present embodiment, the equipment objects that appear in the game are classified into three categories, i.e., close range weapon objects, shield objects and bow and arrow objects. The player character 201 can be simultaneously equipped with one equipment object from each of the three categories. Note that the sword object 202 is an example of a close range weapon object, and the player character 201 can be equipped with a spear object, an axe object, or the like, instead of a sword object, as a close range weapon object. The player character 201 performs an attack action in accordance with the type of the close range weapon object. For example, when equipped with a sword object, the player character 201 performs an action of wielding a sword in response to an attack command, and when equipped with a spear object, the player character 201 performs an action of thrusting a spear in response to an attack command A plurality of close range weapon objects (moreover, the sword object, which is one of the close range weapon objects, includes a plurality of types of sword objects), a plurality of shield objects and a plurality of bow and arrow objects appear in the game, and the player character 201 can be equipped with these objects obtained in the game. Note that in other embodiments, the number of equipment objects that can be simultaneously equipped on the player character may be one.

In the present embodiment, a unified equipment object is generated as the player character 201 uses a predetermined unification item. Specifically, in the game, the player first gives an item specification instruction of specifying a unification item, thereby making the unification item usable for the player character 201. In this state, the player can give an item use instruction of making the player character use the unification item (in other words, a unification instruction), thereby generating a unified equipment object.

Note that in the present embodiment, an item refers to an item that is different from an equipment object and that exerts a particular function associated with the item when used by the player character. A unification item is an example of an item as defined above that enables the player character to generate a unified equipment object. In the present embodiment, the player character can own a plurality of items, and one of the items that the player character owns can be made usable. Note that an item may be an item that is displayed as an object when a game image representing the game field is displayed, or may be an item that is not displayed in the game field (in which case it can be said that the function of the item is an ability of the player character). Moreover, an item may be an item whose item count may decrease each time the item is used or may be an item for which the number of times the item can be used decreases each time the item is used.

FIG. 9 is a view showing an example of a game image when a unification item (not shown) is made usable for the player character. For example, when the player gives an item specification instruction specifying a unification item while in the state shown in FIG. 8, the game system 1 makes the unification item usable for the player character and displays the game image shown in FIG. 9. Note that any operation method may be used as a specific operation method for giving an item specification instruction. For example, the game system 1 may accept, as the item specification instruction, an operation of switching between a plurality of items owned by the player character 201 so as to select the unification item described above as an item that is made usable.

As shown in FIG. 9, in a state where a unification item is usable for the player character 201, the material object is displayed in a manner different from objects other than the material object. Specifically, the material object may be displayed in a different color from other objects, the material object may be displayed with a special effect image, or the material object may be displayed with a special effect image different from those for other objects. In the example shown in FIG. 9, the tusk object 206 and the rock object 207, which are material objects, are displayed in a manner different from the tree object 208, which is not a material object (note that hatching is used in FIG. 9 to represent the difference in the manner of display). Thus, in a state where a game image representing the game field is displayed, objects that are material objects, among other objects on the game field, can be presented to the player in an easy-to-understand manner Note that in other embodiments, only those material objects placed on the game field that are within a detection range to be described later may be displayed in a manner different from other objects that are not material objects.

In a state where a unification item is usable, the game system 1 identifies one of the material objects as a material object to be used in a unification process (referred to as a "target material object"). As shown in FIG. 9, a special effect image 211 is added to the target material object. In the example shown in FIG. 9, the tusk object 206 is the target material object, and the special effect image 211 is added to the tusk object 206.

In the present embodiment, the target material object is one of the material objects existing within a detection range from the position of the player character 201 that is closest to the player character 201. Note however that in other embodiments, the target material object may be one of the material objects existing within a detection range from the position of the player character 201 that is determined based on the position and the direction of the player character 201. Specifically, the closer a material object is to the player character 201 and the smaller the angle formed between the straight line connecting the player character 201 and the material object and the front direction of the player character 201, the more likely the material object is to be selected as the target material object. More specifically, the game system 1 calculates the first score so that the closer the distance from the player character 201 to the material object is, the larger the first score is, and further calculates the second score so that the closer the material object is to the front direction of the player character 201, the larger the second score is. Then, the game system 1 calculates the total score based on the first score and the second score. The total score is calculated so that the larger the first score, the larger the total score, and the larger the second score, the larger the total score (e.g., by adding or multiplying the two scores). In the present embodiment, the material object with the largest total score among the material objects existing within the detection range is the target material object.

For example, the detection range is a range that is in the front direction of the player character 201 (specifically, within an angular range that is within a predetermined angle on the left side and on the right side with respect to the front direction) and that is within a predetermined distance from the position of the player character 201. The detection range may be any range that is determined based on the position of the player character 201. In other embodiments, the detection range may be a range within a predetermined distance from the position of the player character 201 (irrespective of the direction of the player character), or may be a range of the game field displayed on the display 12. Note that when no material object exists within the detection range, no special effect image 211 is displayed.

As described above, in the present embodiment, in a state where the display device is displaying a scene in which a player character equipped with an equipment object and one or more material objects are placed on the game field (see FIG. 9), the game system 1 adds a specification image (e.g., the special effect image 211) to one of the material objects that satisfies a predetermined criterion (e.g., being closest to the position of the player character within the detection range). Then, a unified equipment object is generated based on the equipment object equipped on the player character and the material object specified by the specification image. Thus, in a state where a game image representing the game field is displayed, the material object to be used in the unification process can be presented to the player in an easy-to-understand manner Note that the specification image may be any image with which the player can distinguish the material object to which the specification image is added from other material objects. In other embodiments, a cursor pointing at the target material object (and the target equipment object to be described below) may be displayed as the specification image, or an image that changes the color of the target material object may be displayed. For example, in a case where the special effect image is added to each material object on the game field, a special effect image different from the special effect image described above may be added as a specification image to a target material object in addition to (or instead of) the special effect image described above. In other embodiments, the specification image may not be displayed.

In the present embodiment, the game system 1 generates a unified equipment object based on a material object, from among material objects placed on the game field, that is within a predetermined distance from the position of the player character or the position of the equipment object equipped on the player character. Here, if it were possible to generate a unified equipment object based on any material object on the game field, it would possibly be too easy for the player to generate a desired unified equipment object or a powerful unified equipment object, thus destroying the game balance (e.g., the game becoming too easy). In contrast, the present embodiment imposes a limitation on what material object the player can use to generate a unified equipment object, and it is therefore possible to reduce the possibility of destroying the game balance. Note that while the predetermined distance is a distance that is used to define the detection range in the present embodiment, there is no limitation thereto. For example, the predetermined distance may be equal to the distance that is used for determining objects to be rendered when generating a game image. The determination of whether a material object exists within a predetermined distance is not limited to a method of making the determination by calculating the distance itself, but may be a method of making the determination by calculating an index that is substantially equivalent to the distance. In other embodiments, the game system 1 may be able to generate a unified equipment object based on the material object placed in the game field irrespective of the positional relationship with the position of the player character (or the position of the equipment object equipped on the player character).

The game system 1 may generate a unified equipment object based on the equipment object and one of the material objects placed within a certain range (e.g., the detection range) in the game field that is determined based on the position and the direction of the player character. Then, a material object that is at a position easy to recognize for the player can be determined as the target material object. The player can execute a unification process based on the desired material object by moving the player character. Note that the range described above is the detection range described above and is set based on the position of the player character in the present embodiment, whereas the range described above may be set based on the position of the equipment object equipped on the player character (more specifically, the target equipment object to be described below) in other embodiments. The range described above is not limited to a range that is based on the position of the player character or the equipment object. For example, the range described above may be the entire game field (that is, the game system 1 does not need to have information that defines the range described above). Instead of being determined based on the position and the direction of the player character, the target material object may be determined based on the position and the direction of the equipment object equipped on the player character in other embodiments. Then, the front direction set for each equipment object may be used as the direction of the equipment object. Moreover, in other embodiment, the target material object may be determined based on one of the position and the direction of the player character and the other one of the position and the direction of the equipment object.

As shown in FIG. 9, the special effect image 211 has an integral shape that surrounds the tusk object 206, which is the target material object, and a portion of the player character 201 (the right hand in the example shown in FIG. 9), and that connects together these objects. Thus, the game system 1 displays, as the specification image representing the target material object, an image that associates together the target material object and the player character. This makes it easier for the player to recognize the target material object. Note that the specification image may be of any manner of display such that the player can recognize the target material object. In other embodiments, the game system 1 may display, as the specification image, in addition to the target material object, a special effect image that is different from the special effect image added to a material object other than the target material object. For example, the specification image may be an image representing light of the same color added separately to the target material object and to the player character.

In the present embodiment, an equipment object to be the target of the unification process from among the equipment objects that are equipped on the player character 201 (referred to as the "target equipment object") is specified by the player. Now, in the present embodiment, the game system 1 displays an equipment specification image 210 as an image by which the player specifies the target equipment object (see FIG. 9). The equipment specification image 210 is displayed when a unified equipment object can be generated (that is, where the target material object is placed within the detection range of the player character being able to use the unified item). The equipment specification image 210 is an image that represents, as choices, a plurality of equipment objects being equipped on the player character. In the present embodiment, the game system 1 performs the process of unifying an equipment object that is specified by the player from among the choices represented by the equipment specification image 210 with a target material object. As described above, with the equipment specification image 210, the game system 1 can present an instruction to specify a target equipment object in an easy-to-understand manner for the player. Note that in other embodiments, the game system 1 may accept this instruction without displaying the equipment specification image 210.

In the present embodiment, the equipment specification image 210 shows the association between some instructions to specify the target equipment object and the equipment objects. Specifically, the equipment specification image 210 includes an image representing the association between an instruction representing the left direction and a sword object, an image representing the association between an instruction representing the right direction and a bow and arrow object, and an image representing the association between an instruction representing the down direction and a shield object (see FIG. 9). Where the equipment specification image 210 is displayed, the player gives one instruction from among the left direction, the right direction and the down direction (e.g., an instruction by pressing one of the left direction button 36, the right direction button 33 and the down direction button 34 of the left controller 3). When any of these instructions is given by the player, the game system 1 determines the equipment object corresponding to the instruction to be the target equipment object.

In the present embodiment, in response to an instruction that specifies a target equipment object, the game system 1 performs the process of unifying the target material object with an equipment object that corresponds to the instruction. That is, in the present embodiment, an instruction that specifies a target equipment object serves also as a unification instruction to unify an equipment object and a target material object. This makes it easier for the player to perform an operation for the unification process when the player character is equipped with a plurality of equipment objects. Note however that in other embodiments, the game system 1 may separately accept an instruction to specify a target equipment object and a unification instruction. That is, the game system 1 may perform unification in response to a predetermined instruction, as a unification instruction, after an instruction to specify the target equipment object is given.

Note that there is no limitation on the method for determining the target equipment object. For example, in other embodiments, the game system 1 may determine, as the target equipment object, one of equipment objects that the player character 201 holds ready.

In the present embodiment, the player character 201 can take a ready position with each of the equipment objects being equipped, where the player character 201 holds the equipment object ready. Here, in the ready position, the player character 201 can perform an action of using the equipment object. Specifically, in the ready position in which a close range weapon object is held ready, the player character 201 holds ready the close range weapon object in hand, and the player character 201 performs an action of wielding the close range weapon object (thereby attacking an enemy) in response to an action instruction from the player. In the ready position in which a shield object is held ready, the player character 201 holds ready the shield object in hand, and the player character 201 performs an action of thrusting the shield object forward (thereby deflecting an enemy attack) in response to an action instruction from the player. In the ready position in which a bow and arrow object is held ready, the player character 201 holds ready a bow object in hand with an arrow object nocked therein, and the player character 201 performs an action of shooting the arrow object with the bow object in response to an action instruction from the player.

In the present embodiment, from among the equipment objects equipped on the player character 201, the number of equipment objects with which the player character 201 can take a ready position at a time is 1. That is, the game system 1 can accept a hold-ready instruction to hold a close range weapon object ready, a hold-ready instruction to hold a shield object ready or a hold-ready instruction to hold a bow and arrow object ready, and the player character takes a position in which the player character only holds ready the equipment object corresponding to the hold-ready instruction received. That is, in the present embodiment, a state where the player character 201 is equipped with an equipment object can be said to be a state where the player character 201 can hold the equipment object ready. Note that in the present embodiment, those of the equipment objects being equipped that are not held ready are carried on the back of the player character 201 (see FIG. 8). When the player gives an instruction of putting away an equipment object while the player character 201 is in the ready position holding the equipment object ready, the player character 201 will be no longer in the ready position with the equipment object carried on the back.

Note that in the present embodiment, the player can unify together a material object and an equipment object even when the player character 201 is holding the equipment object ready, as when the player character 201 is not holding the equipment object ready. That is, the player character 201 can hold the equipment object ready even when the unified item can be used, in which case the game system 1 displays the equipment specification image 210 described above and accepts a unification instruction. Then, in response to the player giving a unification instruction, the game system 1 executes a unification process based on the target material object and the target equipment object. Note that in other embodiments, when the player character 201 is holding an equipment object ready, the game system 1 may not accept a unification instruction (i.e., the player is not allowed to give a unification instruction).

In other embodiments, when a unification instruction is accepted while the player character 201 is taking a ready position, the game system 1 may execute a unification process based on the equipment object the player character 201 is holding ready and the target material object in response to the unification instruction. Then, the instruction for the player character 201 to hold an equipment object ready can serve also as an operation of specifying the target equipment object, thereby simplifying the operation.

When the equipment object the player character 201 is holding ready is the target equipment object as described above, the special effect image 211 may associate together the target material object and the target equipment object. For example, the special effect image 211 may have a shape that encircles and connects together the target material object and the target equipment object.

As described above, the special effect image may be an image that associates together the equipment object equipped on the player character and the material object to which the special effect image is added. Then, the game system 1 may generate a unified equipment object based on the equipment object and the material object that are associated together by the special effect image. Then, the base equipment object and the base material object of the unified equipment object can be presented to the player in an easy-to-understand manner.

As will be described later, the unified equipment object based on the sword object 202 and the tusk object 206 has an external appearance where the tusk object 206 is unified with the tip portion of the sword object 202 (see FIG. 10). Therefore, in other embodiments, the special effect image that associates together the target equipment object and the target material object may be a special effect image that associates the target material object with a portion of the target equipment object corresponding to a portion of the unified equipment object that has the external appearance of the target material object. Then, the player can guess the portion of the unified equipment object that has the external appearance of the target material object, and the player can imagine the external appearance of the unified equipment object. Note that the special effect image may be images representing light of the same color added separately to a portion of the target equipment object corresponding to a portion of the unified equipment object that has the external appearance of the target material object and to the target material object.

As described above, in a state where the special effect image 211 is displayed as shown in FIG. 9, the game system 1 generates a unified equipment object in response to a unification instruction from the player. FIG. 10 is a view showing an example of a game image including a player character equipped with a unified equipment object generated. In FIG. 10, as a result of the player giving a unification instruction to specify the sword object 202 in the state shown in FIG. 9, the player character 201 is equipped with an object (referred to as the "tusk sword object") 212 that has an external appearance obtained by unifying together the sword object 202 and the tusk object 206.

In the present embodiment, when a unification instruction is given, the game system 1 first moves the target material object on the game field (the tusk object 206 in FIG. 9) closer to the player character (which may be the target equipment object equipped on the player character 201). In the example shown in FIG. 9, the game system 1 updates the game image as if the tusk object 206 were pulled toward the player character 201 by the special effect image 211. Then, when the target material object comes close to the player character 201, the game system 1 deletes the target material object, and changes the target equipment object equipped on the player character 201 to the unified equipment object (the tusk sword object 212 in FIG. 10) (see FIG. 10).

As described above, when a unification instruction is given while in a state where the display device is displaying a scene in which a player character equipped with an equipment object and a material object are placed on the game field (see FIG. 9), the game system 1 updates the game image so as to move the material object closer to the player character and then change the equipment object equipped on the player character to the unified equipment object. For example, the game image is updated to switch to the unified equipment object when the distance between the material object and the player character becomes less than a predetermined distance or when a predetermined amount of time elapses since the start of the process of moving the material object closer to the player character. According to the description above, when a unified equipment object is generated, the base equipment object and the base material object used for the generation of the unified equipment object can be presented to the player in an easy-to-understand manner Note that there is no limitation on the behavior or the target material object, the target equipment object and the player character when the unified equipment object is generated. For example, in other embodiments, when the unified equipment object is generated, the target material object may be deleted without coming close to the player character.

As shown in FIG. 10, the tusk sword object 212 has an external appearance such that the tusk object 206 is unified with the tip portion of the sword object 202 (in other words, an external appearance such that the tip portion of the sword object 202 is replaced with the tusk object 206). Thus, in the present embodiment, a unified equipment object (e.g., the tusk sword object 212) has an external appearance that includes at least a portion of the external appearance of a base equipment object (e.g., the sword object 202) of the unified equipment object and at least a portion of the external appearance of a base material object (e.g., the tusk object 206) of the unified equipment object. Thus, it is possible to give the player an impression that the unified equipment object is an object obtained by unifying together the equipment object and the material object. Therefore, based on the external appearance of the unified equipment object, the base equipment object and the base material object of the unified equipment object can be recognized easily by the player. Moreover, it is convincing for the player that the unified equipment object is generated based on the equipment object and the material object. Note that there is no limitation on the external appearance of the unified equipment object, and it may be an external appearance that has no overlap with the external appearance of the base material object and/or the external appearance of the base equipment object.

Note that in the example shown in FIG. 10, the external appearance of the unified equipment object is obtained by replacing a portion of the external appearance of the sword object 202, which is the base equipment object, with the entirety of the external appearance of the tusk object 206, which is the base material object. Note however that the external appearance of the unified equipment object may be obtained by replacing a portion of the external appearance of the base equipment object with a portion of the external appearance of the base material object. For example, a unified equipment object based on a first sword object as an equipment object and a second sword object as a material object may have an external appearance obtained by replacing the tip portion of the first sword object with a blade portion (i.e., a portion excluding the handle) of the second sword object.

As described above, in the present embodiment, the game system 1 accepts a unification instruction for generating a unified equipment object in a state where a game image representing the game field is displayed. Then, in a state where the game image is displayed, in response to a unification instruction, the game system 1 updates the game image so as to make the material object disappear on the game field and change the equipment object equipped on the player character to the unified equipment object. Thus, the relationship between the new equipment object (i.e., the unified equipment object) and the base object used for the generation thereof can be presented to the player in an easy-to-understand manner. In the present embodiment, since the unification process is executed while a game image representing the game field is displayed, the player can trigger the unification process without opening a menu screen, thus reducing operations that need to be performed.

Since the present embodiment has a general rule that the external appearance of the unified equipment object takes over at least a portion of the external appearance of each base object, the player can guess what the base objects are based on a unified equipment object or guess what a unified equipment object will be based on the combination of an equipment object and a material object. Therefore, when the player obtains an equipment object or sees a material object on the game field during the game, the player can enjoy guessing what unified equipment objects may be generated using these objects, thus improving the playability of the game. Here, in the game of the present embodiment, it is assumed that there are no equipment objects that are strong or equipment objects that have special functions at the start of the game, and the player advances the game by generating unified equipment objects suitable for the circumstances in the game. Therefore, in the present game, the player needs to strategically advance the game by attempting combining equipment objects and material objects together and guessing what unified equipment objects may be generated by the combinations. In the present embodiment, in the game as described above (i.e., a game in which the player needs to have strategies for combination between equipment objects and material objects), it is possible to further improve the playability of the game by giving the player the fun of guessing about the combination as described above.

[2-2. Material Object]

Next, material objects will be described in detail. In the present embodiment, a unification process is executed based on a material object that is placed (in other words, lying) on the game field. Here, a material object may be an object, such as a rock object, that is placed on the game field in advance at the start of the game, or a material object may be an object, such as a tusk object as described above, that an enemy character drops or that is placed upon defeating an enemy character. A material object may be an object obtained from an object that is not a material object (e.g., firewood that is placed on the game field when the player character attacks the tree object described above).

Objects placed on the game field may include those that are not to be material objects. In the present embodiment, for example, a treasure chest object (specifically, an object that the player character can open to take and store what is inside) and a key object used for opening a door in the game field are not material objects. As will be described later in detail, in the present embodiment, a unified equipment object cannot be brought back (in other words, "split") into the base equipment object and the base material object. Therefore, if a unification process were allowed to be performed based on a treasure chest object or a key object, the player character would no longer be possible to obtain an object inside the treasure chest object or the key object, which may hinder the progress of the game (e.g., the player may become unable to proceed in the story of the game).

In the present embodiment, objects that appear in the game include those that can be stored by the player character (referred to as "storable objects") and those that cannot be stored by the player character (referred to as "unstorable object"). A material object may be either a storable object or an unstorable object. Thus, by also using unstorable objects as material objects, the game system 1 can increase the types of material objects and can generate a wider variety of unified equipment objects.

Note that, in the present embodiment, the player character being able to store an object means the player character being able to carry around the object without being equipped with the object or holding the object in hand. The player character stores an object by putting the object in a container (e.g., a pouch or an item box) that is worn by the player character. Note that such a container may not be displayed. Such a container may not be present in the game field, and only the function of storing objects may be provided. For the stored objects, the game system 1 can display a list of objects of the same category in the menu screen, for example. Then, an external appearance of each stored object is displayed. The external appearance of an object may be displayed using the 3D model used for placing the object in the game field or may be displayed using a two-dimensional image provided for each object separately from the 3D model. Then, a stored object will not be displayed in the game field. Basically, a stored object can be taken out by the player character and placed on the game field or used (e.g., equipped or held in hand) by the player character as needed.

In the present embodiment, when the player character placed on the game field is displayed, equipment objects equipped by the player character are displayed as being worn by the player character (see FIG. 8). Note that in other embodiments, only one of the equipment objects that the player character is holding ready may be displayed as being worn by the player character.

In the present embodiment, an equipment object may be a material object. In the present embodiment, an equipment object may be placed on the game field as are other material objects. For example, when the player character performs the action of throwing or discarding an equipment object being equipped, the equipment object is placed on the game field. For example, when an enemy character equipped with an equipment object is defeated, the equipment object is placed on the game field. Note that all types of equipment objects that can be used in unification processes as equipment objects may not be able to be used as material objects, and some of the types of equipment objects that can be used in unification processes (e.g., an arrow object lying on the ground after being shot) may be objects that cannot be used as material objects.

As described above, an equipment object placed on the game field may be used as a material object, and a unification process can be performed based on such an equipment object as a material object and another equipment object being equipped on the player character. Therefore, for example, the player can generate a unified equipment object based on a sword object equipped on the player character and a sword object or a shield object lying on the game field. For example, as a unified equipment object based on the same two sword objects, a unified equipment object may be generated that has an external appearance including a blade portion of the second sword object in the tip portion of the first sword object. Thus, a unified equipment object generated based on the same two equipment objects may have an external appearance different from the base equipment object while including a portion of the external appearance of the base equipment object. For example, as a unified equipment object based on a sword object and a shield object, there may be generated a unified equipment object that has an external appearance with the shield object attached to the tip portion of the sword object. Thus, a unified equipment object may be generated based on equipment objects of different categories.

The player character may pick up and equip with an equipment object placed on the game field in response to an instruction from the player. That is, in the present embodiment, an equipment object placed on the game field may be used as a material object for generating a unified equipment object or may be used as it is as an equipment object for the player character.

As described above, in the present embodiment, when a unification instruction is given while in a state where the display device is displaying a scene in which a player character and an equipment object are placed on the game field, the game system 1 generates a unified equipment object using the equipment object on the game field as a material object. Thus, an equipment object is given two different uses, thereby improving the strategic aspect of the game.

Note that if an equipment object on the game field does not serve as a material object, the equipment object cannot be used in a unification process under certain circumstances (i.e., circumstances where it is placed on the game field), whereas it can be used in a unification process under other circumstances (i.e., circumstances where the player character is equipped with the equipment object). Then, it may be difficult for the player to know whether an equipment object is an object that can be used in a unification process, and it may be misleading for the player as to whether an equipment object is an object that can be used in a unification process. In contrast, according to the present embodiment, an equipment object can be used in a unification process whether it is equipped on the player character or placed on the game field. Therefore, it is possible to reduce the possibility of such a mislead. Note that in other embodiments, the game system 1 may be configured so that an equipment object on the game field does not become a material object.

Note that not all of the equipment objects that appear in the game need to be objects that can be used in a unification process. In the present embodiment, some equipment objects of a particular kind, from among all the equipment objects that appear in the game, are objects that cannot be used in a unification process. Note that "the equipment objects of a particular kind" may refer to different equipment objects, such as sword objects, from among all the equipment objects included in the category of close range weapon objects described above, for example, or may refer to a particular equipment object such as a particular sword object from among different kinds of sword objects, for example. Such an equipment object that cannot be used in a unification process does not become a target of a unification process when placed on the game field or when the player character is equipped with the equipment object.

FIG. 11 is a table showing an example of the relationship between the equipment object, the material object and the unified equipment object to be generated based on these objects. In the example shown in FIG. 11, it is assumed that of all the objects that appear in the game, equipment objects that can be used in a unification process are equipment objects A to Z, and material objects that can be used in a unification process (including those equipment objects that are used as material objects) are material objects 1 to n (n is an integer). In the present embodiment, as shown in FIG. 11, unified equipment objects to be generated as a result of a unification process (unified equipment objects A1 to An, B1 to Bn and Z1 to Zn in FIG. 11) are predetermined for all the combinations between equipment objects A to Z and material objects 1 to n. That is, any of the equipment objects A to Z that can be used in a unification process can be unified with any of the material objects 1 to n that can be used in a unification process.

As described above, in the present embodiment, the game system 1 generates a unified equipment object for any of the combinations between material objects that can be used in the generation of a unified equipment object and equipment objects that can be used in the generation. Herein, if there is a material object "that can be used in a unification process with an equipment object A that can be used in a unification process but cannot be used in a unification process with another equipment object B that can be used in a unification process", for example, it will be difficult for the player to know what combination between an equipment object and a material object can be used in a unification process. In contrast, according to the present embodiment, any equipment object that can be used in a unification process can be unified with any material object that can be used in a unification process. Thus, it is easy for the player to know what combinations between equipment objects and material objects can be used in a unification process. Note that in other embodiments, the game system 1 may be configured so that a unified equipment object cannot be generated for some combinations between a plurality of material objects that can be used for generating a unified equipment object and a plurality of equipment objects that can be used for the generation.

[2-3. Unified Equipment Object]

In the present embodiment, as with an equipment object, the player character can set a unified equipment object in the state of being stored by the player character. In the present embodiment, the game system 1 sets a unified equipment object in the state of being stored by the player character under a predetermined condition (e.g., when there is an instruction from the player). Then, the player character can unequip and store a generated unified equipment object, and the player character can selectively use a plurality of unified equipment objects. Since the player character can store a plurality of unified equipment objects, there is never a case where the player cannot store, and has to discard, unified equipment objects. Rather, the player can save them, and the player can therefore execute unification processes without hesitation. Note that in other embodiments, the game system 1 may be configured so that unified equipment objects generated based on unstorable material objects are unstorable or unified equipment objects are all unstorable.

In the present embodiment, it is not possible to split a unified equipment object into a base equipment object and a base material object thereof in response to an instruction from the player. This is to prevent the player character from carrying around an unstorable object as described above. Specifically, in the present embodiment, there are unstorable objects that can be material objects. Here, if it were possible to split a unified equipment object into the base equipment object and the base material object, it would be possible for the player to convert an unstorable object into a unified equipment object, move the player character that is equipped with or stores the unified equipment object, and then split the unified equipment object back into an unstorable object. Using this method, it would be possible to move an unstorable object from a place where the unstorable object is placed in the first place on the game field to a different place. However, being able to move an unstorable object to a place that is different from where it is placed in the first place may possibly hinder the progress of the game. For example, there may be a problem when an unstorable object present in the game field can be used as an object having a volume. As an example, it may result in a problem that the player character is enabled to go over a wall, which the player character is not supposed to be able to go over, by using a box object that has been moved from another place as a platform. As another example, there may be a problem when a unstorable object can be used in a gluing process to be described below. In contrast, in the present embodiment, by not allowing the player to split a unified equipment object, it is possible to reduce the possibility of such a problem.

Note that "a unified equipment object being unsplittable" means that a unified equipment object cannot be split back into the base material object and the base equipment object, and means that it is not splittable if only one of the base material object and the base equipment object can be obtained from a unified equipment object. In the present embodiment, it may be possible to turn a unified equipment object back into a base equipment object by deleting the base material object. That is, when a condition for making a unified equipment object disappear is satisfied, the game system 1 makes the unified equipment object disappear, and make the base equipment object of the unified equipment object appear in the game while not making the base material object of the unified equipment object appear in the game. For example, when a "go back" command is executed in response to an instruction from the player while a unified equipment is selected on the screen displaying a list of stored objects, the game system 1 may substantially turn the unified equipment into the base equipment object by adding the base equipment object to the stored objects while deleting the unified equipment from the stored object. Note that "to make an object appear in the game" as used above means that this object exists for the settings of the game, and does not require that the model of the object be placed or not be placed in the game field. That is, "to make an object appear in the game" means that the object is placed in the game field or that the object is stored by the player character.

Note that in other embodiments, a unified equipment object may be able to be split into the base equipment object and the base material object. For example, a unified equipment object may be split into the base equipment object and the base material object based on a condition that is not an instruction from the player. For example, a unified equipment object may be split under a predetermined circumstance in the game (e.g., when a predetermined game event occurs at a certain point in the story of the game).

Figure 12:
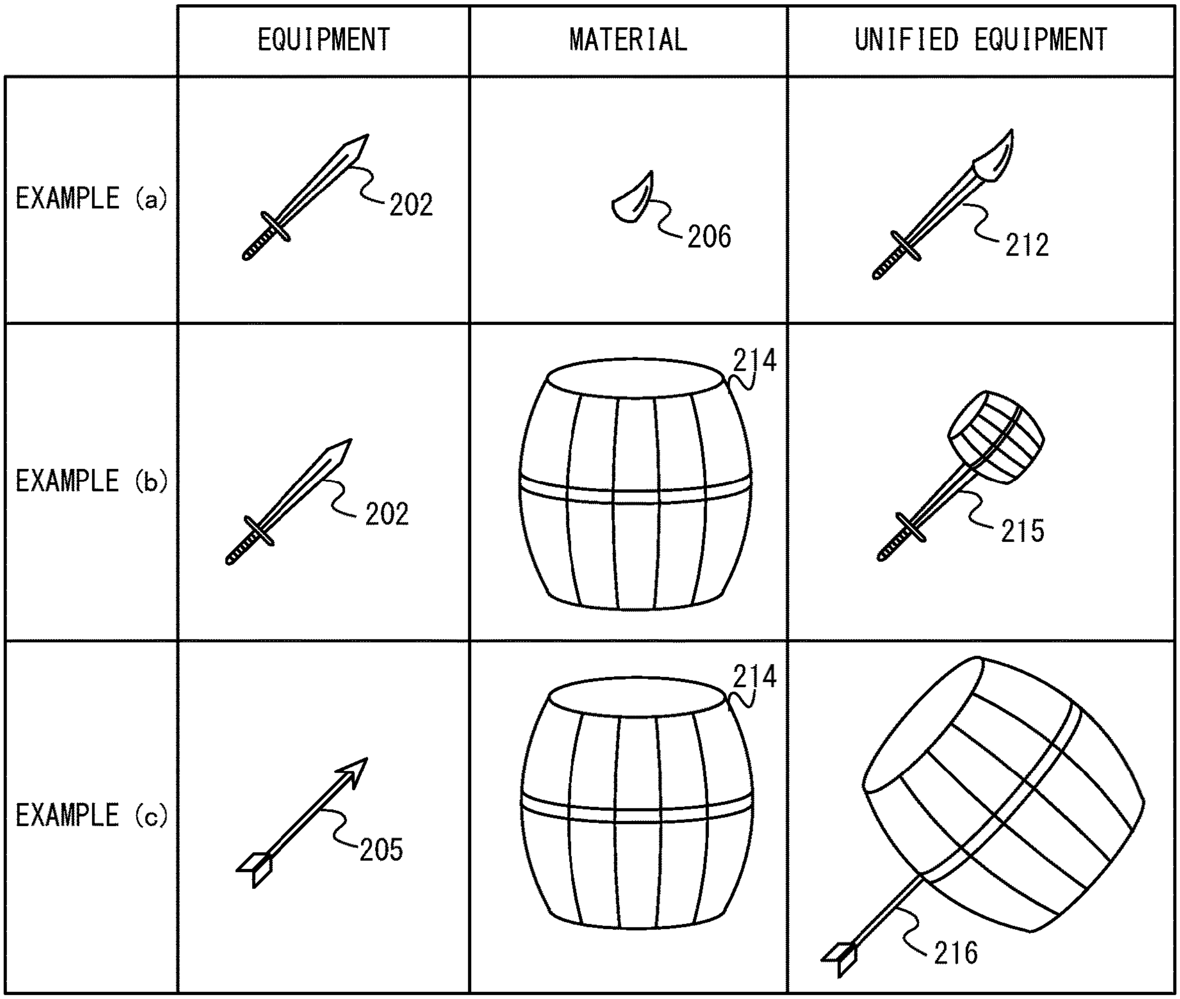
FIG. 12 is a view showing an example of the external appearance of the equipment object and the material object and the external appearance of the unified equipment object to be generated based on these objects.

FIG. 12 is a view showing an example of the external appearance of the equipment object and the material object and the external appearance of the unified equipment object to be generated based on these objects. As described above, a unified equipment object has an external appearance including a portion of the external appearance of the base equipment object of the unified equipment object (hereinafter referred to as the "equipment external appearance portion") and a portion of the external appearance of the base material object of the unified equipment object (hereinafter referred to as the "material external appearance portion"). Here, in the present embodiment, the material external appearance portion of a unified equipment object may have a different size from the base material object.

Example (a) shown in FIG. 12 is an example where the tusk sword object 212 is generated as a unified equipment object based on the sword object 202 and the tusk object 206. Example (a) is an example where the size of the material external appearance portion is equal to the size of the base material object. That is, as shown in FIG. 12, the unified equipment object (i.e., the tusk sword object 212) has an external appearance obtained by replacing a portion of the external appearance of the base equipment object (i.e., the sword object 202) of the unified equipment object with a portion or whole of the external appearance of the base material object (i.e., the tusk object 206) of the unified equipment object. Then, the player can easily guess the external appearance of the unified equipment object from the external appearance of the base equipment object and the external appearance of the base material object. Note that while a unified equipment object has the entire external appearance of the base material object of the unified equipment object in the example shown in FIG. 12, it may have a part of the external appearance of the base material object in other embodiments. For example, the tusk sword object 212 shown in FIG. 12 may have an external appearance obtained by replacing the tip portion of the sword object 202 with the tip portion of the tusk object 206.

Example (b) shown in FIG. 12 is an example where a barrel sword object 215 is generated as a unified equipment object based on the sword object 202 and a barrel object 214 representing a barrel. Example (b) is an example where the size of the material external appearance portion is shrunk from the base material object. That is, as shown in FIG. 12, the unified equipment object (i.e., the barrel sword object 215) has an external appearance obtained by replacing a portion of the external appearance of the base equipment object (i.e., the sword object 202) of the unified equipment object with a portion or whole of the external appearance of the base material object (i.e., the barrel object 214) of the unified equipment object. Then, as with Example (a) shown in FIG. 12, the player can easily guess the external appearance of the unified equipment object. When a large object such as the barrel object 214 is used as a material object, it is possible to prevent the unified equipment object from being too large. Therefore, it is possible to reduce the possibility that it may become hard to see the player character being blocked by the unified equipment object.

Example (c) shown in FIG. 12 is an example where a barrel arrow object 216 is generated based on the arrow object 205 and the barrel object 214. Note that in the present embodiment, when a unification process is performed where the equipment object is a bow and arrow object, the unification process is executed based on an arrow object, rather than a bow object, thereby resulting in the generation of a unified arrow object. The barrel arrow object 216 is an example of a unified arrow object. When an arrow object equipped on the player character is changed to a unified arrow object, it can be said that the unified equipment object equipped on the player character is composed of a bow object and a unified arrow object.

Example (c) shown in FIG. 12 is an example where the same material object (i.e., the barrel object 214) as Example (b) is used, but the size of the material external appearance portion is equal to the size of the base material object. With the barrel object 214, the size of the material external appearance portion is shrunk from the base material object in Example (b) described above, whereas the size of the material external appearance portion is equal to the size of the base material object in Example (c).

Here, a unified arrow object (i.e., the barrel arrow object 216), which is a kind of an arrow object, may be left on the game field after being shot, in which case because the equipment external appearance portion representing an arrow object is relatively small, it may possibly seem to the player that the base barrel object 214 is left on the ground. If the size of the material external appearance portion, which has the external appearance of the barrel object 214, of the barrel arrow object 216 were shrunk from the base barrel object 214, it may possibly seem to the player that a shrunk barrel object is left on the ground, and the player may erroneously think that there is a barrel object that is not normal. Therefore, in the present embodiment, with a unified equipment object based on an arrow object, the size of the material external appearance portion is kept unchanged from the base material object so as to reduce the possibility of misleading the player. Note that with a unified arrow object, which is a kind of an arrow object, the player character takes a ready position in which the unified arrow object is nocked in a bow object. When the player character takes such a ready position, the game system 1 displays on the display 12 a game image representing the game field as the player character 201 is seen from behind (see FIG. 16). Therefore, in the game image displayed, the unified arrow object is placed forward of the player character. Therefore, it is believed that there is little possibility that it may become hard to see the player character even if the material external appearance portion is large.

Note that in other embodiments, the material external appearance portion of a unified arrow object may also be scaled (specifically, shrunk). Here, the material external appearance portion of a unified arrow object based on a certain material object may be scaled so as to be larger than the material external appearance portion of a unified equipment object based on a material object and an equipment object other than an arrow object (it can also be said that the material external appearance portion of a unified arrow object is closer to the size of the material object than the material external appearance portion of the unified equipment object). This also reduces the possibility of misleading the player.

When a unified arrow object that has been shot misses an enemy character and falls onto the field, for example, the game system 1 may split the unified arrow object into the base arrow object and the base material object and place the base arrow object and the base material object in the vicinity of the spot where the arrow landed. Note that where a unified arrow object has a particular special effect to be imparted when the arrow is shot, when the arrow is being shot, or when the arrow contacts the field (e.g., where the unified arrow object is an arrow that blows up), the unified arrow object may disappear when falling down on the field.

As described above, in the present embodiment, the first equipment object includes a projectile object (e.g., the arrow object 205) and a projectile weapon object (e.g., the bow object 204) for shooting the projectile object. Here, a unified projectile object generated based on a projectile object and a material object (e.g., the barrel object 214) has an external appearance obtained by replacing a portion of the external appearance of the base projectile object of the unified projectile object with a portion or whole of the external appearance of the base material object of the unified projectile object (Example (c) shown in FIG. 12). In contrast, a unified projectile object generated based on a second equipment object not including a projectile object (e.g., the sword object 202) and the material object (e.g., the barrel object 214) has an external appearance obtained by replacing a portion of the external appearance of the second equipment object with a portion or whole of the external appearance of a shrunk version of the material object (Example (b) shown in FIG. 12). Thus, in the present embodiment, the game system 1 changes the size of the material external appearance portion of a unified equipment object depending on the type of the equipment object. Thus, it is possible to reduce the possibility that it may become hard to see the player character being blocked by the unified equipment object, and to reduce the possibility of misleading the player when the unified equipment object is placed on the game field. Note that in other embodiments, the game system 1 may be configured so that the size of the material appearance portion of a unified equipment object based on a single type of a material object is unchanged irrespective of the type of the equipment object.

Note that in the present embodiment, an enemy character equipped with a unified equipment object may appear in the game. That is, the game system 1 places, on the game field, a character that is a non-player character (e.g., an enemy character) not controlled by the player and that is equipped with a unified equipment object. Therefore, the player who sees such a non-player character can observe the equipment of the non-player character, and may discover a new unified equipment object not yet known to the player or may discover a capability of such a unified equipment object. In the present embodiment, since a unified equipment object includes a portion of the external appearance of the base equipment object and a portion of the external appearance of the base material object, the player can guess how to generate the unified equipment object equipped on the non-player character (specifically, the equipment object and the material object used for the generation) based on the external appearance of the unified equipment object. Thus, the game system 1 can motivate the player to generate unified equipment objects. Note that in other embodiments, a non-player character may be unable to be equipped with a unified equipment object while only the player character can be equipped with a unified equipment object.

[2-4. Durability Value of Object]

In the present embodiment, an equipment object is assigned an equipment durability value representing the durability of the equipment object. In the present embodiment, the game system 1 decrements the equipment durability value as the equipment object is used, and the equipment object breaks (i.e., disappears) when the equipment durability value is 0. For example, the equipment durability value is decremented by 1 each time the player character performs an action using the equipment object (e.g., wield a sword object). For example, in the present embodiment, when a fire is brought close to an equipment object of a burnable material, the equipment object catches on fire, in which case the equipment durability value of the equipment object is decremented by 1 for each passage of a predetermined amount of time (e.g., 1 second). Note that for a bow and arrow object, a bow object is assigned an equipment durability value and an arrow object is not assigned an equipment durability value. Among all the equipment objects that appear in the game, there may be some types of objects that are not assigned equipment durability values.

Equipment objects that are not assigned equipment durability values may be objects that cannot be used in a unification process.

When a unified equipment object is generated based on an equipment object that is assigned an equipment durability value, the game system 1 assigns an equipment durability value also to the unified equipment object. There is no limitation on the initial value of the equipment durability value of a unified equipment object (i.e., the value upon generation). For example, the initial value may be determined based on the equipment durability value of the base equipment object (e.g., the value immediately before generation) or may be a value that is predetermined in the game. When the equipment durability value of a unified equipment object is 0, the unified equipment object disappears as does an equipment object. Note that when a unified equipment object disappears, the base material object is not brought back into existence. This is to reduce the possibility that an unstorable object may be moved to a place that is different from where it is placed in the first place, thereby hindering the progress of the game, as described in "[2-3. Unified equipment object]" above.

As described above, in the present embodiment, when the equipment durability value assigned to the unified equipment object indicates that the durability has exhausted (e.g., has reached 0), the game system 1 makes the unified equipment object disappear without making the base equipment object and the base material object of the unified equipment object appear in the game. Then, in the game, the player searches for an equipment object and a material object in order to generate a unified equipment object, and when the generated unified equipment object breaks, the player again searches in order to generate a new unified equipment object, thereafter repeating the cycle. Therefore, in the present embodiment, it is possible to motivate the player to repeatedly generate unified equipment objects in the game. Note that in other embodiments, a unified equipment object may be splittable as described above. Then, the endurance values of the material object and the equipment object that have been separated may be set to any values. For example, they may be set to the initial values, or may be set based on the equipment endurance value of the unified equipment object immediately before the split.

In the present embodiment, some material objects are assigned material durability values representing the durability of the material objects. When a unified equipment object is generated based on an equipment object that is assigned a material durability value, the game system 1 assigns a material durability value also to the unified equipment object. That is, a unified equipment object may be assigned two different durability values, i.e., an equipment durability value and a material durability value. There is no limitation on the initial value of the material durability value of a unified equipment object (i.e., the value upon generation). For example, the initial value may be determined based on the material durability value of the base material object (e.g., the value immediately before generation) or may be a value that is predetermined in the game. Note that in other embodiments, a material durability value may be assigned also to a unified equipment object generated based on a material object that is not assigned a material durability value.

As with the equipment durability value, the game system 1 decrements the material durability value as the unified equipment object is used. Note that the method of decrementing the equipment durability value and the method of decrementing the material durability value may be the same or different from each other.

Here, when the material durability value of a unified equipment object is 0 while the equipment durability value thereof is not 0, the game system 1 makes the unified equipment object disappear while the base equipment object is revived. Note that this does not mean that the unified equipment object is split into the base equipment object and the base material object, as the base material object is not revived. Note that there is no limitation on the initial value (i.e., the value upon revival) of the equipment durability value of the revived equipment object. For example, the initial value may be determined based on the equipment durability value of the unified equipment object (e.g., the value immediately before revival) or may be a value that is predetermined in the game.

Note that for a unified equipment object that is assigned a material durability value, when the equipment durability value thereof is 0, the unified equipment object disappears, even if the material durability value is not 0, and the base material object is not brought back into existence.

As described above, in the present embodiment, the game system 1 assigns a material durability value to a unified equipment object generated based on a material object that is assigned a durability value. Then, when the material durability value assigned to the unified equipment object equipped on the player character indicates that the durability has exhausted, the game system 1 makes the unified equipment object disappear and generates the base equipment object of the unified equipment object. Thus, the unified equipment object can take over a property of the material object (i.e., the property of having a durability value). When the material durability value indicates that the durability has exhausted, the equipment object equipped on the player character appears in the game as if a portion of the unified equipment object that has the external appearance of the material object had disappeared. Therefore, the equipment object equipped on the player character can be changed in an easy-to-understand manner for the player. Note that when a portion of the unified equipment object that has the external appearance of the material object is made to disappear as described above, the game system 1 may place, on the game field, an object that has the same external appearance as the base material object and does not have the function of the material object (such that the material object cannot be used in a unification process or the material object may not exert the intended function). As in the present embodiment, this can also give the player an impression as if a portion of the unified equipment object that has the external appearance of the material object had disappeared. Note that in other embodiments, when the material endurance value set for the unified equipment object indicates that the endurance has been exhausted, the game system 1 may make the unified equipment object simply disappear (i.e., not generate the base equipment object of the unified equipment object). In other embodiments, the game system 1 may be configured so that the material endurance value is not set even for a unified equipment object based on a material object for which an endurance value is set.

For the "base equipment object of a unified equipment object", the equipment durability value upon generation does not need to be equal to the equipment durability value of the equipment object immediately before the unification process for the unified equipment object. There is no limitation on the equipment durability value of the equipment object upon generation. For example, the equipment durability value may be the equipment durability value of the unified equipment object immediately before disappearance. The generated equipment object may be in the state where the player character is equipped with the generated equipment object or may be in the state of being placed on the game field (e.g., placed at the foot of the player character).

[2-5. Capability of Unified Equipment]

In the present embodiment, a unified equipment object has a capability that is different from the base equipment object of the unified equipment object. That is, the game system 1 assigns a unified equipment object a capability that is different from the capability of the base equipment object of the unified equipment object. This motivates the player to advantageously proceed in the game by generating an appropriate unified equipment object depending on the circumstances in the game, thereby improving the strategic aspect of the game. Specific examples of capabilities of unified equipment objects will now be described.

Here, "the capability of a unified equipment object being different from the capability of an equipment object" means: (a) the capability value assigned to the unified equipment object is different from the capability value assigned to the equipment object; and (b) the unified equipment object has a function that the equipment object does not have (or the function of the equipment object changes). For example, in the present embodiment, a unified equipment object may have an improved capability value from the capability value assigned to the base equipment object (e.g., the attack power of a sword object), or may have a function that the base equipment object does not have. Note that below are some examples of such functions, for example.

- A unified equipment object based on a shield object and a rocket object may have a function of giving propulsion to the player character (as will be described below in detail)
- A unified equipment object based on a sword object and a tail object may have a function of attacking an enemy with a tail whip (this can be said to be a function of expanding the attack range)
- A unified equipment object based on a shield object and a fire block object that throws a flame may have a function of throwing a flame Note that there is no limitation on the capability assigned to a unified equipment object, and any of various capabilities and functions may be assigned.

In the present embodiment, a capability of a unified equipment object is a capability obtained by adding a certain capability to the base equipment object. Here, the game system 1 determines, depending on the base material object, the capability to be added to the unified equipment object as compared with the base equipment object. For example, a unified equipment object based on a sword object and a tusk object has a capability with an improved attack power from the sword object, whereas a unified equipment object based on the sword object and a rock object has a capability obtained by adding, to the sword object, the function of destroying another object that cannot be destroyed by the sword object.

Note that the capability to be added to a unified equipment object may be determined to vary depending on the base equipment object. For example, the capability of a unified equipment object based on a crystal object, which is a material object, and a sword object is a capability with an improved attack power from the sword object, whereas the capability of a unified equipment object based on the crystal object and a shield object may be a capability with an improved equipment durability value from the shield object.

The capability to be added to a unified equipment object may be the same for each base material object, irrespective of the base equipment object. For example, for a material object, the capability of a unified equipment object based on the material object may be a capability with an improved equipment durability value from the base equipment object irrespective of the base equipment object.

When a unified equipment object is generated based on an equipment object, the attack action to be performed by the player character 201 may be the same before and after the unification process. For example, when a unified equipment object is generated based on a sword object as an equipment object and a spear object as a material object, the attack action for this unified equipment object may be the sword wielding action, as with the base sword object. Note that in other embodiments, the attack action to be performed by the player character 201 may differ before and after the unification process. For example, when a unified equipment object is generated based on a sword object as an equipment object and a spear object as a material object, the attack action for this unified equipment object may change from the wielding action for the base sword object to the thrusting action for a spear object since the unified equipment object has become longer in length.

Figure 13:
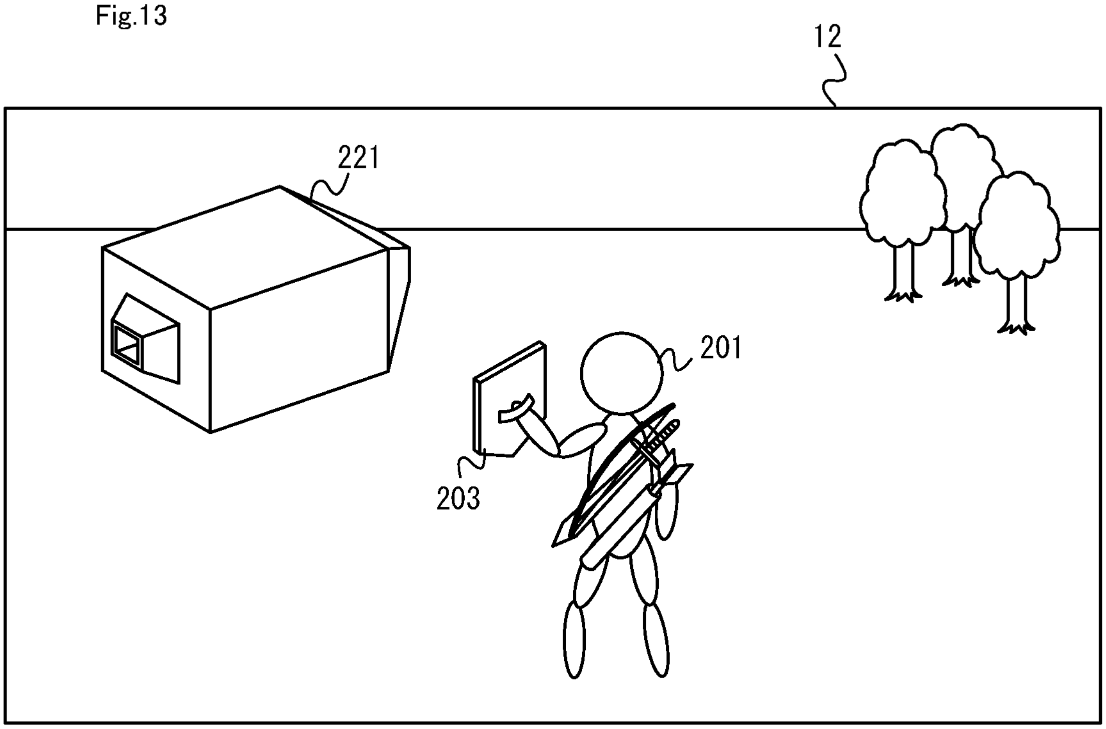
FIG. 13 is a view showing an example of a game image showing a game field in which a rocket object is placed.

Next, referring to FIG. 13 to FIG. 15, as an example of a unified equipment object, a unified equipment object having the function of giving propulsion to the player character will be described. FIG. 13 is a view showing an example of a game image representing the game field in which a rocket object is placed. The rocket object 221 shown in FIG. 13 is a material object. The rocket object 221 has the function of generating propulsion. Specifically, the rocket object 221 can take an active state in which propulsion is generated and an inactive state in which propulsion is not generated. In the present specification, a switch function object refers to an object that can take an active state in which a function is exerted and an inactive state in which a function is not exerted. Note that the rocket object 221 takes an active state for a certain amount of time under a certain condition (e.g., on the condition that the rocket object 221 is attacked by the player character 201, or the like), and the rocket object 221 in the active state generates propulsion to move forward.

In a case where the rocket object 221 is placed on the game field as shown in FIG. 13, the player character 201 can generate a unified equipment object using the rocket object 221 as a material object (see "[2-1. Outline of unification process]" above). In the example shown in FIG. 13, when the player character 201 is taking a ready state with the shield object 203, a unified equipment object is generated based on the shield object 203 and the rocket object 221 in response to the player giving a unification instruction that specifies the shield object 203.

Figure 14:
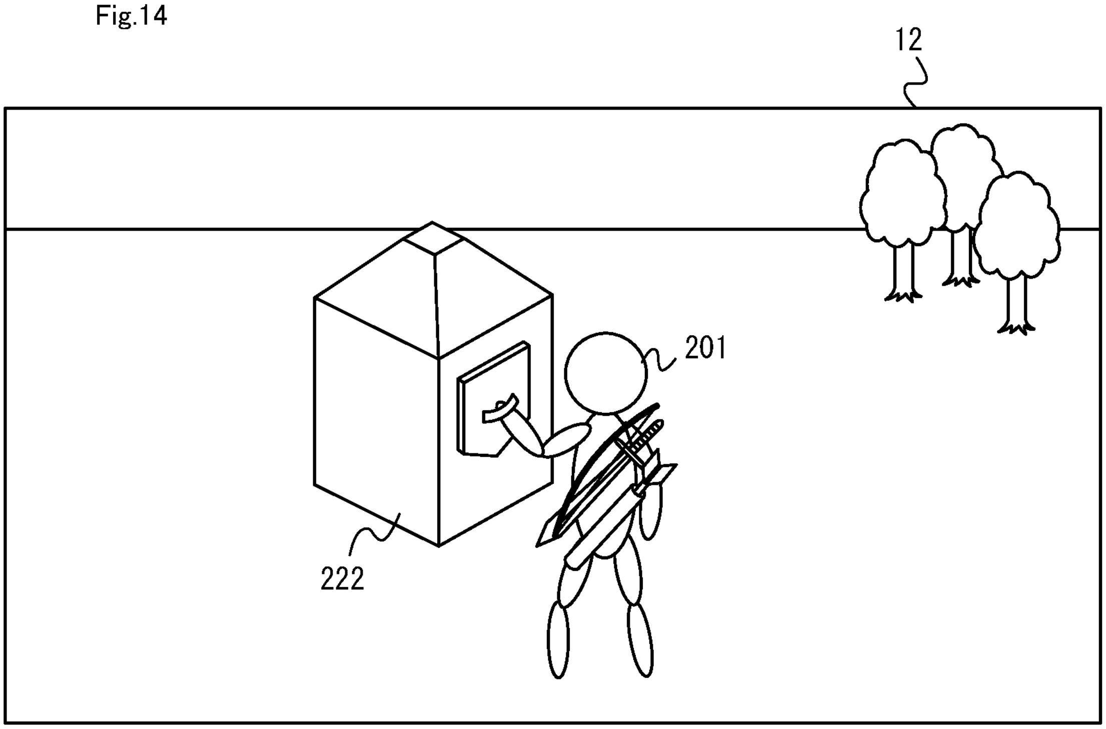
FIG. 14 is a view showing an example of a game image when a unified equipment object based on a shield object and a rocket object is generated.

FIG. 14 is a view showing an example of a game image when a unified equipment object based on a shield object and a rocket object is generated. In FIG. 14, the player character 201 takes a ready position with a unified equipment object (referred to as a "shield rocket object") 222 based on the shield object 203 and the rocket object 221. Here, as with the base rocket object 221, the shield rocket object 222 has a function of generating propulsion, and can take an active state in which propulsion is generated and an inactive state in which propulsion is not generated. In the present embodiment, when the player character 201 takes a ready position as shown in FIG. 14, the shield rocket object 222 is in an inactive state and does not generate propulsion. Note that in an inactive state, the shield rocket object 222 exerts the defense function as a shield object. Note however that since the collision detection area of the shield rocket object 222 is larger than the base shield object 203, the shield rocket object 222 can block an attack from an enemy character farther in front than the shield object 203. The shield rocket object 222, relative to the base shield object 203, may be given a capability other than the function of generating propulsion. For example, the equipment durability value may be increased as the shield rocket object 222 is generated based on the shield object 203.

Figure 15:
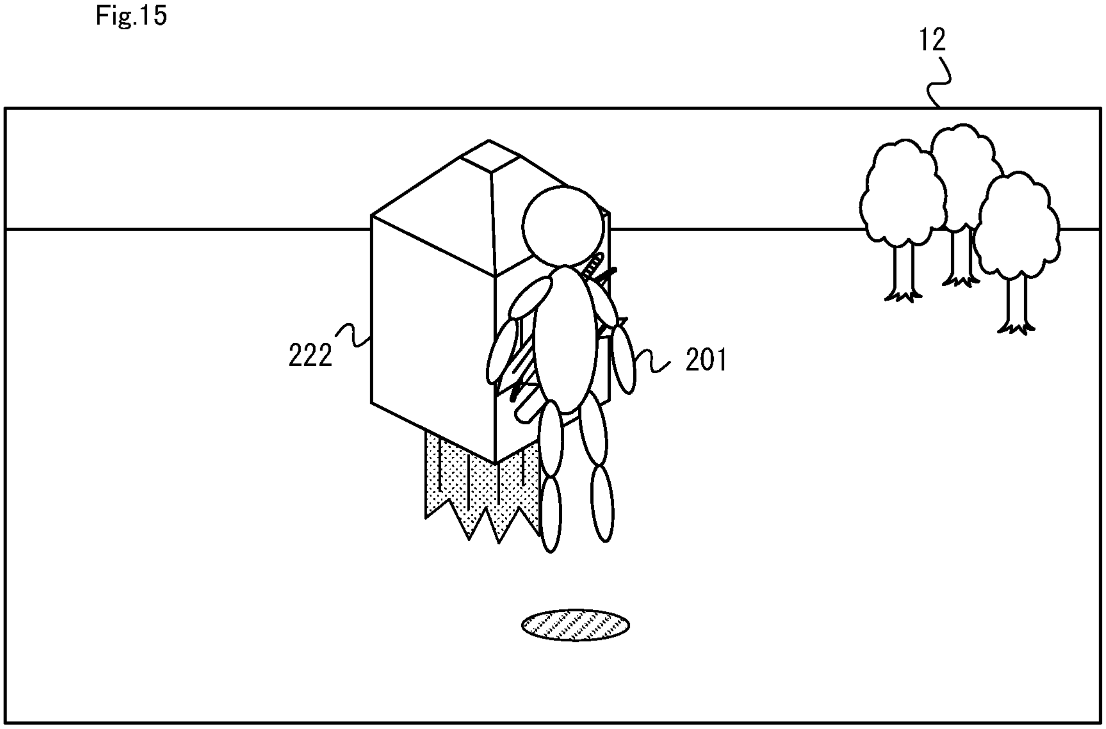
FIG. 15 is a view showing an example of a game image when a shield rocket object is generating propulsion.

FIG. 15 is a view showing an example of a game image when the shield rocket object is generating propulsion. In the present embodiment, the shield rocket object 222 is activated in response to the player character 201 releasing the ready position for the shield rocket object 222 (i.e., performing an action of carrying it on the back). That is, since the shield rocket object 222 generates propulsion, the shield rocket object 222 gives propulsion to the player character 201, and the player character 201 therefore moves upward (see FIG. 15). Thus, in the present embodiment, the player character 201 can fly by using the shield rocket object 222. Note that in the present embodiment, this function of the shield rocket object 222 is inactivated when the player character 201 takes a ready position for the shield rocket object 222. The shield rocket object 222 is inactivated also after staying active for a certain amount of time. Note however that in other embodiments, a unified equipment object that can take an active state and an inactive state may stay active while a predetermined condition is satisfied (e.g., until the player character performs a predetermined action).

As described above, in the present embodiment, a material object may be a switch function object that can take an active state in which a predetermined function of the material object is exerted on the game field and an inactive state in which the predetermined function is not exerted. Then, the game system 1 controls a unified equipment object based on a switch function object to exert a predetermined function in response to the player character performing a predetermined action using the unified equipment object. Thus, as functions of base material objects are reflected in unified equipment objects, unified equipment objects can have a wide variety of capabilities. Since the player can control the player character 201 to perform a predetermined action so as to activate a unified equipment object, the player can control the unified equipment object to exert the function at a desired point in time. Note that the predetermined function exerted by a unified equipment object may be an independent function that is exerted independently of the basic function that is exerted by the unified equipment object through the predetermined action. For example, a unified equipment object based on a sword object exerts a basic function of "giving an impact on another object in contact" through the action of wielding the sword. Then, the independent function is not a function (e.g., a function of destroying the other object on which an impact has been given) that is exerted on the assumption that the basic function is exerted, but is a function (e.g., generating propulsion, throwing a flame, etc.) that is exerted independently of the exertion of the basic function (i.e., not on the assumption of the exertion of the basic function). Note that in other embodiments, a unified equipment object based on a switch function object does not need to be able to take an active state and an inactive state, but may always exert the function (i.e., the object always takes an active state and does not take an inactive state).

Note that while the "predetermined action" is an action of releasing the ready position (specifically, an action of putting away a shield object) in the example shown in FIG. 15, the action is not limited thereto and it may be any other action. Specifically, the predetermined action may be an action of taking a ready position (e.g., an action of holding a shield object ready) or may be an action of using an equipment object in the ready position (e.g., an action of wielding a sword object). For example, when a material object is a fire block object that can take an active state where the object throws a flame and an inactive state where the object does not throw a flame, a unified equipment object based on a shield object and a fire block object may take an active state where the object throws a flame and an inactive state where the object does not throw a flame. Then, a flame may be thrown in response to the player character's action of holding the shield object ready, and the flame may be stopped in response to the player character's action of putting away the shield object.

As described above, the "predetermined action" may be the same action as an action that the player character can perform using the base equipment object of the unified equipment object. For example, in the present embodiment, the player character can perform actions of wielding a sword object, accumulating power (with a sword object), holding a shield object ready, throwing an equipment object, putting away an equipment object, etc. Then, the predetermined action may be any of these actions performing using a unified equipment object. Thus, the player can control the player character to perform actions that are normally performed using an equipment object so as to switch between the active state and the inactive state depending on the action performed.

The predetermined function of a material object and the predetermined function of a unified equipment object based on the material object do not need to be the same in the strict sense, but may only need to match each other to such a degree that the player can recognize the relevance between the functions. For example, regarding the rocket object 221 and the shield rocket object 222 described above, it can be said that the functions are the same so long as they both "generate propulsion" in the general sense, even if they differ from each other in terms of the magnitude of propulsion or the duration of the active state.

As described above, in the present embodiment, a material object may be a propulsion object (e.g., the rocket object 221) that has a function of generating propulsion. Then, when the player character is equipped with a unified equipment object based on a propulsion object, the game system 1 controls the unified equipment object to generate propulsion so as to move the player character in the game field. Note that moving in the game field is not limited to moving on the ground but means to include any type of moving in the game field (i.e., the 3-dimensional game space). Thus, a unified equipment object such as a weapon or an armor can be given a function (propelling the player character) different from the original function of the equipment object. Therefore, it is possible to increase the variety of functions of unified equipment objects. Note that the information process for moving the player character by means of a propulsion object may be a process of moving the player character as a result of controlling a unified equipment object to generate propulsion as described above, or may be a process of directly propelling the player character.

Note that the propulsion object is not limited to the rocket object 221 but may be any other object. For example, the propulsion object may be a balloon object having the function of floating in the air. Then, a unified equipment object based on a shield object and a balloon object may exert propulsion so that when in an active state, the player character 201 is floated in the air (i.e., floats upward). The propulsion object does not need to take an active state and an inactive state and may constantly exert the function (i.e., may be always in the active state and never be in the inactive state).

[2-6. Unification Process Based on Material Object Stored by Player Character]

As described above, the game system 1 generates a unified equipment object based on a material object that is placed on the game field and an equipment object equipped on the player character. Here, in the present embodiment, for a bow and arrow object (more specifically, an arrow object), which is a kind of an equipment object, a unified equipment object may be generated based on a material object stored by the player character and an equipment object equipped on the player character. A unification process based on a material object stored by the player character will now be described.

Figure 16:
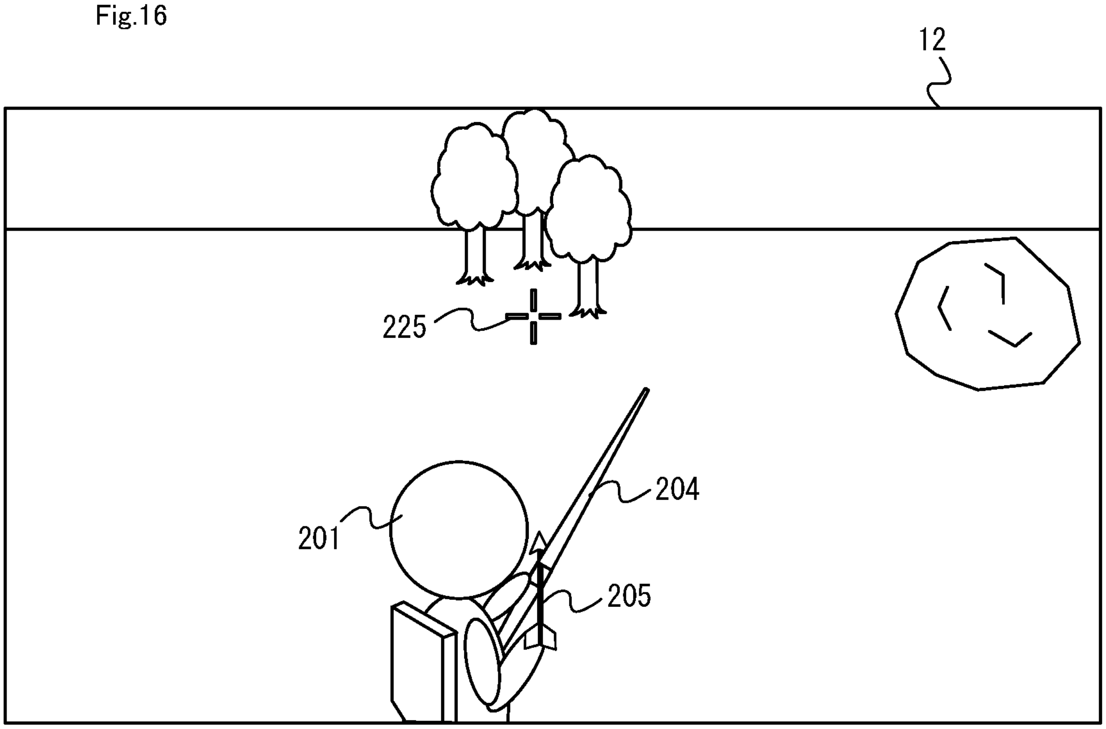
FIG. 16 is a view showing an example of a game image when a player character takes a ready position with a bow and arrow object, having performed the action of nocking an arrow object.

FIG. 16 is a diagram showing an example of a game image when the player character takes a ready position with a bow and arrow object, having performed the action of nocking an arrow object (referred to as the "ready-to-shoot state"). In the present embodiment, in the ready-to-shoot state, the game system 1 displays on the display 12 a game image representing the game space as the player character 201 is seen from behind (see FIG. 16). The game image includes a sight marker 225. The sight marker 225 represents the shooting direction of the arrow object 205 when the arrow object 205 is shot in response to a shooting instruction from the player. Note that in the ready-to-shoot state, the player can give an instruction to change the shooting direction as well as the shooting instruction.

Figure 17:
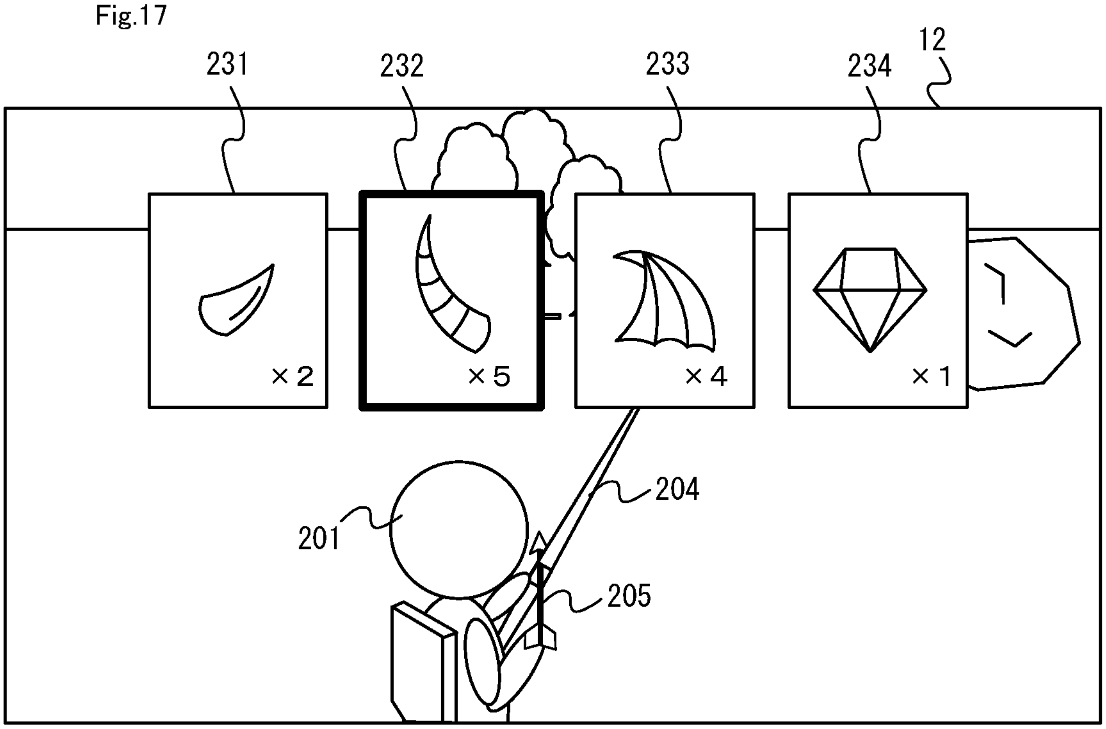
FIG. 17 is a view showing an example of a game image after an object display instruction is given in the state shown in FIG. 16.

In the present embodiment, in the ready-to-shoot state, the player can give an object display instruction to display an object stored by the player character 201. FIG. 17 is a view showing an example of a game image after an object display instruction is given in the state shown in FIG. 16. The game system 1 accepts an object display instruction in the ready-to-shoot state, and displays the game image shown in FIG. 17 in response to an object display instruction.

The game image shown in FIG. 17 includes stored material object images 231 to 234, representing some of the objects stored by the player character 201 that are material objects. Each of the stored material object images 231 to 234 includes an image representing the material object and the number of the material objects stored by the player character 201.

Based on an instruction from the player, the game system 1 selects one of the stored material object images 231 to 234. In the present embodiment, a stored material object image being selected is displayed in a different manner from the stored material object images being not selected. In the example shown in FIG. 17, the stored material object image 232 being selected is displayed with a bold frame as compared with the stored material object images 231, 233 and 234 being not selected.

In a state where the stored material object images 231 to 234 are displayed, the player can give a unification instruction. That is, the game system 1 accepts a unification instruction in the state described above, and executes a unification process in response to a unification instruction. Specifically, the game system 1 generates a unified arrow object based on a material object that is indicated by the stored material object image being selected and an arrow object that is held ready by the player character 201 (i.e., nocked by the player character 201). Note that the operation for giving a unification instruction in the state described above may be an operation different from the operation for giving a unification instruction in the state where the equipment specification image 210 is displayed as described above.

Figure 18:
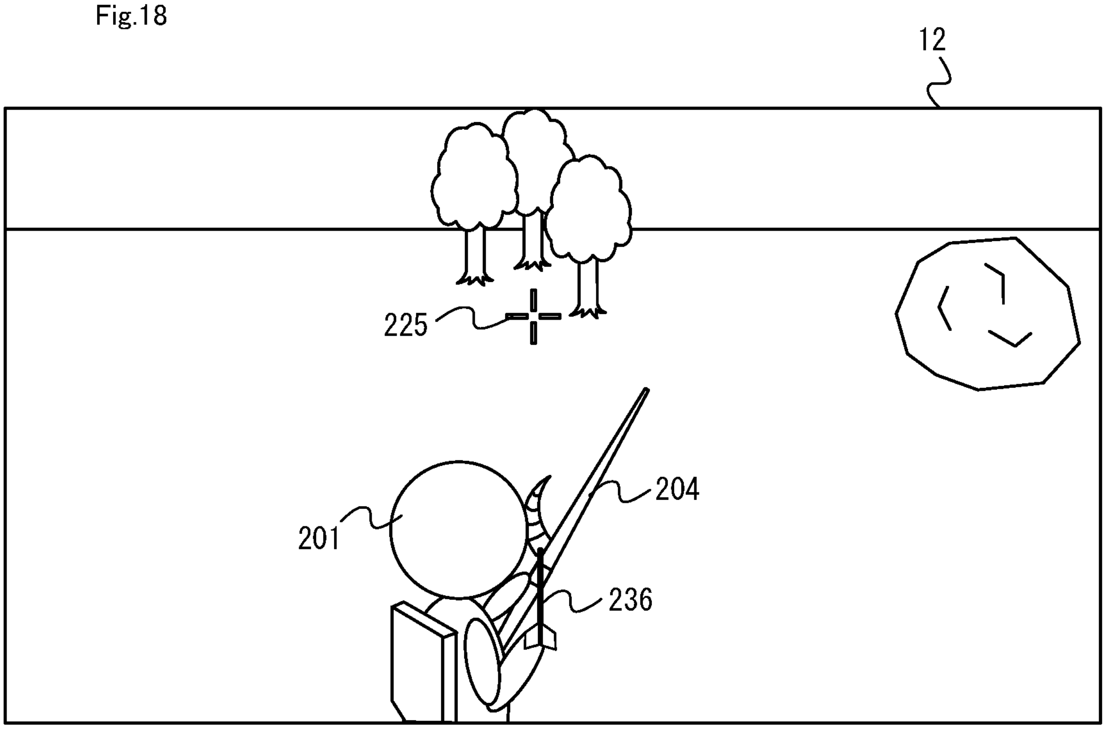
FIG. 18 is a view showing an example of a game image after a unified arrow object is generated.

FIG. 18 is a view showing an example of a game image after a unified arrow object is generated. As shown in FIG. 18, the game system 1 updates the game image so that the player character 201 is equipped with a generated unified arrow object 236 instead of the arrow object 205 what was equipped on the player character 201 before the unification process. Note that the unified arrow object 236 has an external appearance that is obtained by replacing a portion of the external appearance of the arrow object 205 (specifically, the tip portion) with the external appearance of the horn object, which is being selected at the time of the unification instruction. In the ready-to-shoot state shown in FIG. 18, the player can give a shooting instruction to make the player character 201 shoot the unified arrow object 236, which is a kind of an arrow object.

As described above, in the present embodiment, when a unification instruction is given while in a state where the player character is ready to shoot a projectile object (e.g., an arrow object) with a projectile weapon object (e.g., a bow object) and where one of the material objects stored by the player character is being selected (see FIG. 17), the game system 1 generates a unified projectile object (e.g., a unified arrow object) representing a projectile obtained by unifying together the projectile object and the material object being selected. The game system 1 displays an image of switching from the projectile object of the equipment object equipped on the player character on the game field to the unified projectile object. Here, when shooting is done using a unified projectile object based on the projectile object, another possible method is for the player character to once discard the stored material object so that the material object is placed on the game field so that a unified projectile object is generated based on the material object on the game field and the projectile object equipped on the player character. Note however that with a projectile object such as an arrow object, there is a need to perform the unification process each time the arrow object is shot, and with the method described above, the player needs to perform the operation of discarding the material object each time the arrow object is shot, thereby increasing operations that need to be performed. In contrast, in the present embodiment, a material object stored by the player character is allowed to be used directly in the unification process, and the player can therefore easily perform the operation of controlling the player character to shoot using a unified projectile object.

In the present embodiment, it is assumed that a material object stored by the player character is allowed to be used directly in the unification process only for an arrow object among other equipment objects. Here, in other embodiments, a material object stored by the player character may be allowed to be used directly in the unification process also for equipment objects other than an arrow object (e.g., a sword object and a shield object).

Note that when the player character releases the ready state in the ready-to-shoot state where the player character nocks the unified arrow object, the game system 1 does not reverse the unified arrow object but stores in memory that the unified arrow object has been generated. Then, when the player character takes a ready state with a bow and arrow object next time, the game system 1 brings the player character 201 into a ready-to-shoot state where the player character 201 again nocks the unified arrow object stored in memory. Then, when the player character releases a ready state and then again takes a ready state, the player does not need to give a unification instruction again, thus simplifying the operation.

When the state in which a unified arrow object is generated is stored in memory, the game system 1 may turn the unified arrow object back into the base arrow object under a certain condition. For example, where the state is stored in memory, the unified arrow object may be turned back into the base arrow object in response to the game field where the player character 201 is located being changed (e.g., the player character 201 moves from the game field on the ground to a dungeon game field). Then, the base material object of the unified arrow object may disappear. Alternatively, if the base material object of the unified arrow object is originally placed on the game field, the game system 1 may place the material object on the original game field, whereas if the material object is originally stored, the game system 1 may bring the material object in a stored state.

Note that in other embodiments, in the ready-to-shoot state where a unified arrow object is nocked by the player character, if the player character releases the ready position, the game system 1 may turn the unified arrow object back into an arrow object and place the base material object of the unified arrow object on the game field (e.g., at the foot of the player character). In other embodiments, in such a case, the base material object of the unified arrow object may be again stored rather than being placed on the game field.

In other embodiments, the game system 1 may be able to re-attach a material object, which is unified in a unified arrow object, to another material object. Specifically, in a ready-to-shoot state in which a unified arrow object is nocked by the player character, the player character may select a material object from among the stored material objects, the nocked unified arrow object may be changed to a unified arrow object based on the selected material object. Note that the base material object of the unified arrow object before the change may be placed on the game field (e.g., at the foot of the player character), may be stored, or may be deleted. The base material object of the unified arrow object before the change may be placed on the game field if it was originally placed on the game field or may be brought back to a stored state if it was stored.

Note that in other embodiments, the game system 1 may be configured so that a unified projectile object based on a material object which is a storable object can be set in the state of being stored by the player character and a unified projectile object based on a material object which is an unstorable object cannot be set in the state of being stored by the player character.

[2-7. Object Gluing Process]

In the present embodiment, the player character can glue together objects on the game field by using a gluing item other than a unification item as described above. The gluing process of gluing together objects will now be described.

Note that "to glue together objects" as used in the present specification means to secure one object to the other object while maintaining the shapes of the objects. Note that "gluing" can be said to be a form of "unification" described above. Note however that in the present embodiment, the gluing process is performed with two objects that are placed on the game field and not equipped on the player character, whereas the unification process is performed with an object equipped on the player character and an object that is placed on the game field and not equipped on the player character. Note that the difference between the gluing process and the unification process in the present embodiment will be described below.

Figure 19:
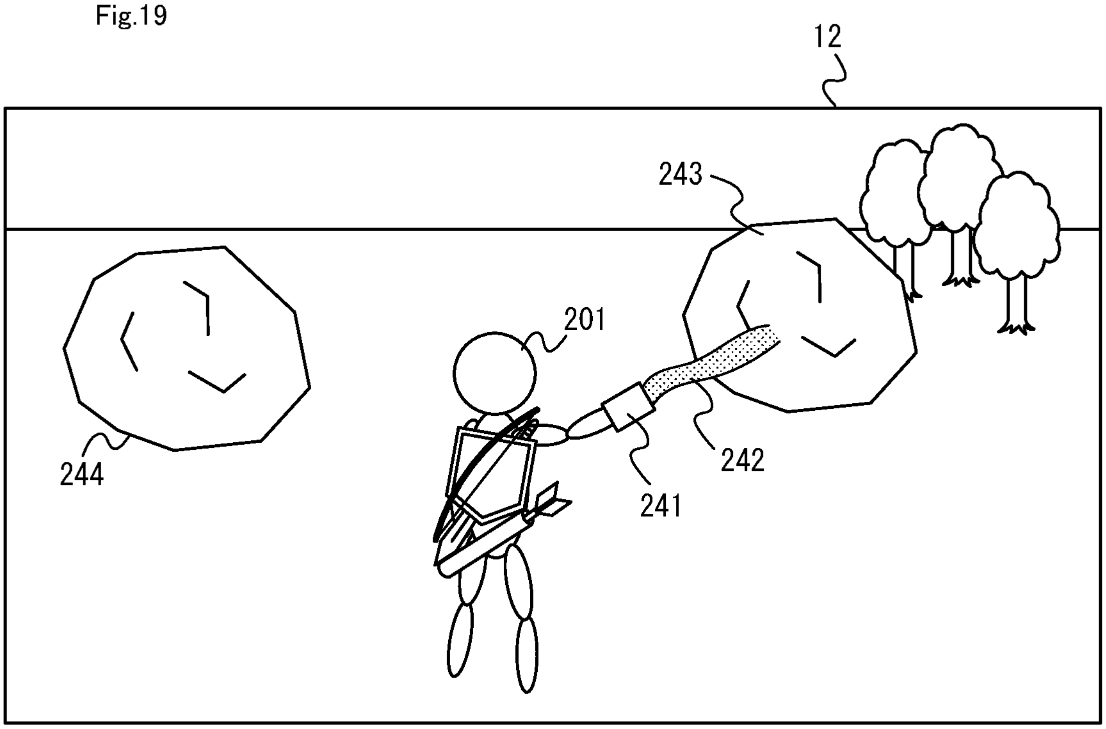
FIG. 19 is a view showing an example of a game image when a material object is placed on a game field.

FIG. 19 is a view showing an example of a game image when a material object is placed on the game field. On the game field shown in FIG. 19, the player character 201 is placed and two rock objects 243 and 244 are placed. In the present embodiment, it is assumed that material objects are objects that can be glued together by the gluing process, and the following description uses an example where two rock objects 243 and 244 are glued together. Note however that in other embodiments, it is not necessary that all of the material objects be objects that can be glued, and non-material objects may be objects that can be glued.

In the game, the player can give an item specification instruction, thereby making a gluing item usable for the player character 201. Moreover, in such a state, by giving a target specification instruction, the player can specify the first object to be used in the gluing process. For example, the player can give a target specification instruction by making a predetermined input while an object is being specified by a sight marker, which is displayed when the gluing item is usable. The game image shown in FIG. 19 shows a state where the rock object 243 is being specified as the first object to be used in the gluing process (referred to as the "first gluing target object"). As shown in FIG. 19, in the game image, a special effect image 242 is displayed that associates together the gluing item 241, which is put on the player character 201, and the rock object 243, which is the first gluing target object. Thus, an object that is the first gluing target object, among other objects on the game field, can be presented to the player in an easy-to-understand manner Note that also in a state where the gluing item is usable for the player character 201, as in a state where the unification item is usable, the game system 1 may display the material object in a different manner from other objects that are not material objects.

Figure 20:
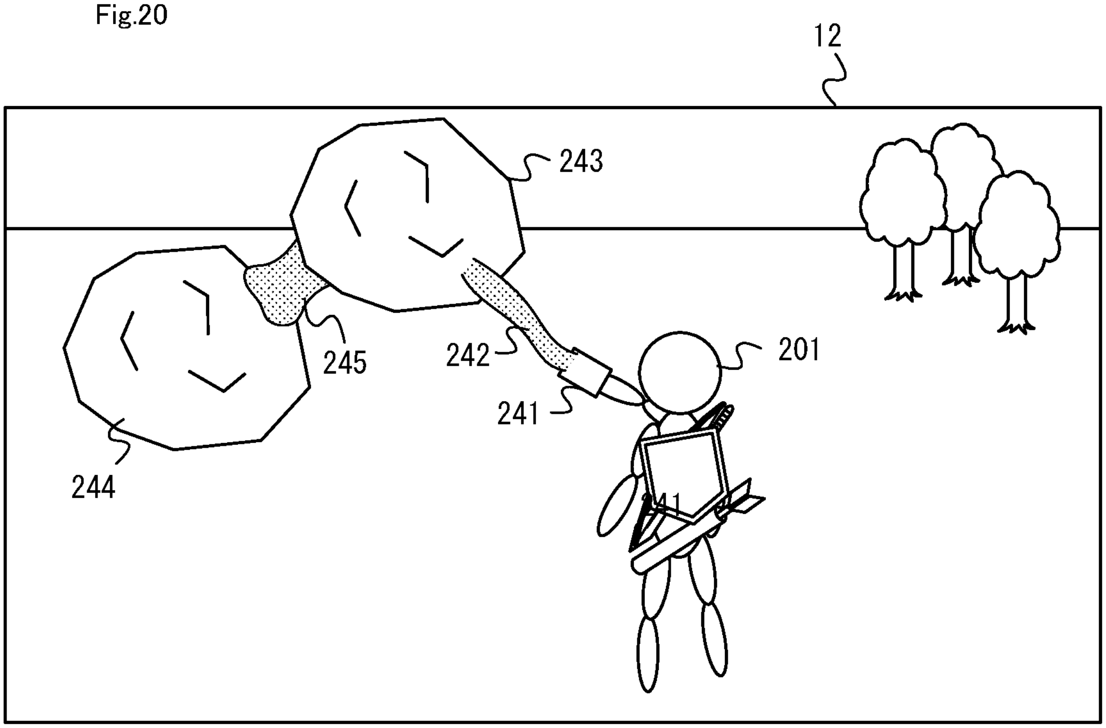
FIG. 20 is a view showing an example of a game image when a player character has moved a first gluing target object.

FIG. 20 is a view showing an example of a game image when the player character has moved the first gluing target object. As shown in FIG. 20, in the present embodiment, in a state where the first gluing target object is being specified, the player character 201 can move the first gluing target object. Specifically, the game system 1 controls the position of the first gluing target object so as to place the first gluing target object in front of the player character 201. Therefore, as the player character 201 changes its position and/or direction, the position of the first gluing target object changes. In response to a distance change instruction from the player, the game system 1 controls the distance from the player character 201 to the first gluing target object. Therefore, the position of the first gluing target object changes also in response to the distance change instruction.

As shown in FIG. 20, when the position of the first gluing target object is within a predetermined distance from another material object, the game system 1 specifies this material object as the second object to be used in the gluing process (referred to as the "second gluing target object"). Then, a special effect image 245 is displayed that associates together the two objects (two rock objects 243 and 244 in FIG. 20) to be used in the gluing process. Note that when the first gluing target object is not located within a predetermined distance from another material object, the special effect image 245 is not displayed (see FIG. 19). Therefore, whether the second gluing target object is being specified and, if so, which material object is being specified can be presented to the player in an easy-to-understand manner by means of the special effect image 245.

Figure 21:
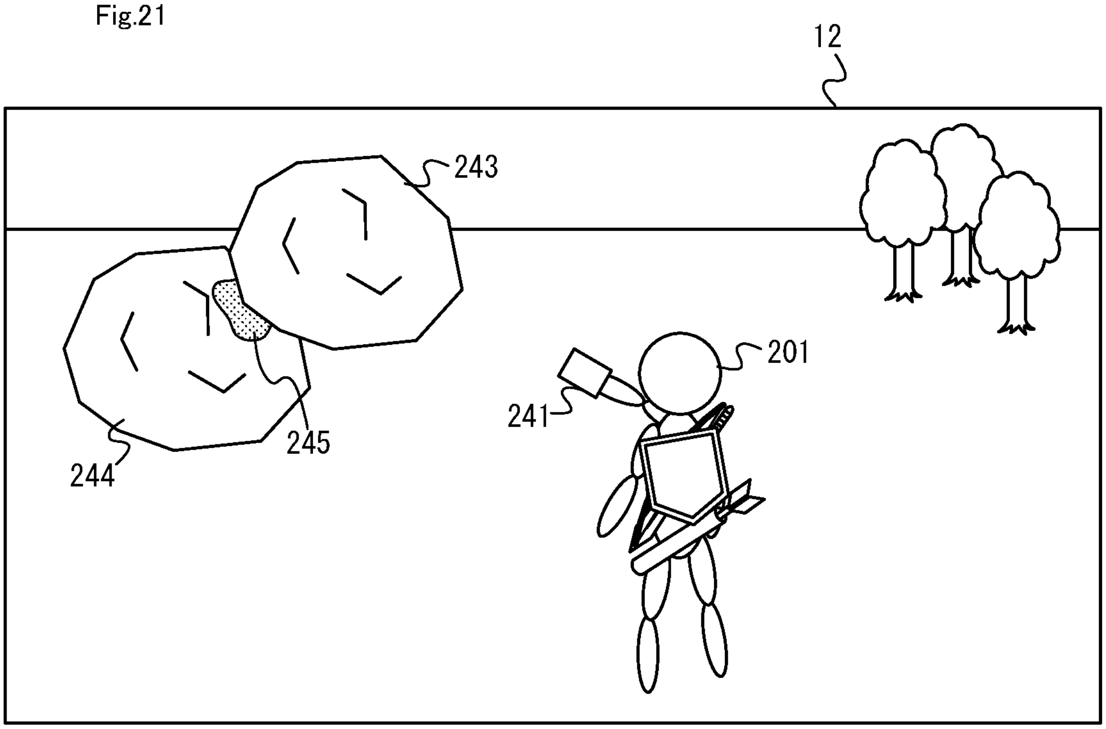
FIG. 21 is a view showing an example of a game image after two gluing target objects are glued together.

In response to a gluing instruction from the player while in a state where the second gluing target object is specified, the game system 1 executes the gluing process of gluing together the two gluing target objects. FIG. 21 is a view showing an example of a game image after the two gluing target objects are glued together. In the example shown in FIG. 21, the two rock objects 243 and 244, which are the gluing target objects, are glued together. The special effect image 245 is displayed between the two rock objects 243 and 244 in order to indicate to the player in an easy-to-understand manner that the two rock objects 243 and 244 are glued together. Two material objects on the game field are glued together as described above.

As described above, in the present embodiment, when a gluing instruction is given from the player while in a state where a plurality of material objects are placed on the game field, the game system 1 places, on the game field, a glued object obtained by gluing together the material objects. Thus, material objects placed on the game field can also be used in the gluing process as well as in the unification process described above, thereby expanding the usability of material objects in the game. This, for the player, extends the strategic aspect and the playability of the game using material objects. Note that in other embodiments, the game system 1 may not perform a gluing process.

In the present embodiment, since an equipment object is a type of a material object, when an equipment object is placed on the game field, the equipment object can also be glued with another material object by the gluing process. That is, when a gluing instruction is given while in a state where a plurality of objects, including an equipment object, are placed on the game field, the game system 1 places, on the game field, a glued object obtained by gluing together the equipment object and another object. Then, the equipment object can be used both in the unification process and in the gluing process, thereby expanding the usability of equipment objects in the game, thus extending the strategic aspect and playability of the game using equipment objects. Note that it is not necessary that all types of equipment objects be usable in the gluing process as material objects, and some types of equipment objects (e.g., an arrow object lying on the ground after being shot) may be objects that cannot be used in the gluing process as material objects. An equipment object may not be able to be used in the gluing process as a material object.

Note that the gluing process (and a glued object) differs from the unification process (and a unified equipment object) as follows, for example.

As for the gluing process, a glued object obtained by gluing together two material objects can be further glued with another material object (or another glued object). That is, when a gluing instruction is given while in a state where a glued object obtained by gluing together a plurality of material objects and a material object are placed on the game field, the game system 1 placed, on the game field, a new glued object obtained by gluing together the glued object and the material object. Thus, a glued object may be an object obtained by gluing together three or more material objects. Note that in other embodiments, the game system 1 may be configured so that a glued object obtained by gluing together two material objects cannot be further glued to another material object (or another glued object).

As for the unification process, the game system 1 does not execute a unification process based on a unified object. That is, the game system 1 does not generate a unified equipment object based on a unified equipment object equipped on the player character and a material object placed on the game field. This is for limiting the number of combinations between equipment objects and material objects in the unification process, hence the amount of data of the game program. Note that in the present embodiment, the game system 1 generates a unified equipment object based on data that defines the external appearance and the capability of the unified equipment object based on the equipment object and the material object. That is, in order to determine the external appearance and the capability of a unified equipment object generated by a unification process, the game system 1 provides in advance, in the game program, data that defines the external appearance and the capability for all unified equipment objects each corresponding to a combination of an equipment object and a material object. Note that in other embodiments, the data may be data that defines at least one of the external appearance and the capability of unified equipment objects.

Here, if it were possible to perform a unification process based on a unified equipment object and a material object, it would be possible to make a combination of an equipment object and a plurality of material objects. Then, there may be too many combinations between equipment objects and material objects, and the amount of data that defines the capabilities of unified equipment objects may become too large. Therefore, in the present embodiment, a unification process between an equipment object and a glued object (i.e., a plurality of material objects) is not performed, thereby preventing the amount of data that defines the capabilities of unified equipment objects from becoming too large.

Note that as described above, a unified equipment object cannot be split into the base equipment object and the base material object of the unified equipment object by an instruction from the player. On the other hand, in the present embodiment, a glued object can be split into the base objects thereof when a release instruction is given by the player. That is, in response to a release instruction given while in a state where a glued object is specified, the game system 1 splits the glued object into the base material objects thereof, and places the base material objects on the game field. Thus, when the result of a gluing process is not as intended by the player, the player can re-do the gluing process, and it is possible to improve the degree of freedom of the gluing process. When the player wishes to perform a unification process based on a base material object of a glued object, the player can split the glued object into the base material objects thereof and perform such a unification process.

In the present embodiment, a unified equipment object can be stored by the player character, whereas a glued object cannot be stored by the player character. A glued object based on an equipment object and a material object is an object that cannot be equipped on the player character. Here, a glued object can be split into base objects as described above. Therefore, if the player character can carry a glued object around by storing or equipping with the glued object, an unstorable object may be moved to a place that is different from where it is placed in the first place, thereby hindering the progress of the game, as described in "[2-3. Unified equipment object]" above. Therefore, in the present embodiment, the player character is not allowed to store or be equipped with a glued object.

In the present embodiment, as for the gluing process, the game system 1 generates a glued object by securing together material objects in a positional relationship that is determined based on the position and attitude of each material object. That is, in the gluing process, the positional relationship in which two objects are glued together varies depending on the position and attitude of each object at the time of gluing, and therefore the external appearance of a glued object based on the same two objects may vary. Thus, in the present embodiment, it is possible to increase the variations of glued objects. Note that in other embodiments, in the gluing process, the game system 1 may glue together two objects so that they are in a positional relationship as determined in the game program.

On the other hand, in the present embodiment, as for the unification process, the game system 1 generates a unified equipment object by securing together an equipment object and a material object in a predetermined positional relationship. That is, unified equipment objects based on the same two objects have the same external appearance (e.g., the external appearance of the tusk sword object 212 based on the sword object 202 and the tusk object 206 shown in FIG. 12 does not vary). Thus, the unification process differs from the gluing process. According to the description above, the external appearance of a unified equipment object based on the same combination of an equipment object and a material object does not vary. Therefore, it is easy for the player to guess the external appearance of a unified equipment object. Note that in other embodiments, the external appearance of a unified equipment object by a unification process may vary.

In the present embodiment, for a unified equipment object, the capability based on the combination of the base equipment object and the base material object is determined separately from the capabilities of the base objects (see "[2-5. Capability of unified equipment]" above). In contrast, for a glued object, the capability is not determined separately from the capabilities of the base objects. Thus, the gluing process differs from the unification process.

3. Specific Example of Process in Game System

Figure 22:
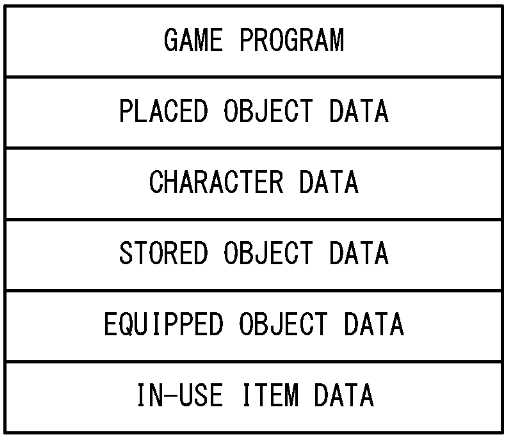
FIG. 22 is a table showing an example of various data used in information processes performed in a non-limiting game system.

Next, referring to FIG. 22 to FIG. 27, a specific example of an information process in the game system 1 will be described. FIG. 22 is a table showing an example of various data used in information processes performed in the game system 1. Various data shown in FIG. 22 are stored in a storage medium accessible by the main body unit 2 (e.g., the flash memory 84, the DRAM 85 and/or a memory card attached to the slot 23, etc.).

As shown in FIG. 22, the game system 1 stores a game program. The game program is a game program for executing a game of the present embodiment (specifically, the game process shown in FIG. 23 to FIG. 27). The game system 1 stores placed object data, character data, stored object data, equipped object data and in-use item data.

The placed object data is data representing objects (e.g., material objects, etc.) placed on the game field. The placed object data represents the position and the type of each object, for example. The placed object data also includes data that indicates whether each material object is glued to another object.

The character data represents information regarding the state of the player character. The character data represents the position and the posture of the player character (e.g., whether the player character is in a ready position, etc.), for example.

The stored object data represents objects (including equipment objects and material objects) stored by the player character. For example, the stored object data represents the type of each object and the number of objects stored. For each object that is assigned a durability value (specifically, an equipment durability value or a material durability value), the stored object data also includes durability value data that represents such a durability value.

The equipped object data represents an equipment object or equipment objects being equipped on the player character. The equipped object data also includes data that represents one of the equipment objects being equipped that is held ready by the player character.

The in-use item data represents an item (including a unification item and a gluing item) that is in the state of being usable for the player character.

FIG. 23 to FIG. 27 are flow charts each showing an example of the flow of a process to be executed by the game system 1. The processes shown in FIG. 23 to FIG. 27 are each started when the game status becomes a status to be described below while the game program is executed.

Note that in the present embodiment, it is assumed that the processor 81 of the main body unit 2 executes the game program stored in the game system 1, thereby executing the processes of the steps shown in FIG. 23 to FIG. 27. Note however that in other embodiments, some of the processes of the steps described above may be executed by another processor (e.g., a dedicated circuit, or the like) different from the processor 81. Where the game system 1 can communicate with another information processing apparatus (e.g., a server), some of the processes of the steps shown in FIG. 23 to FIG. 27 may be executed in the other information processing apparatus. The processes of the steps shown in FIG. 23 to FIG. 27 are merely illustrative, and the order of steps to be performed may be switched around or other processes may be executed in addition to (or instead of) the processes of the steps, as long as similar results are obtained.

The processor 81 executes the processes of the steps shown in FIG. 23 to FIG. 27 using a memory (e.g., the DRAM 85). That is, the processor 81 stores information (in other words, data) obtained in each process step in the memory, and when the information is used in a subsequent process step, the information is read out from the memory and used.

Figure 23:
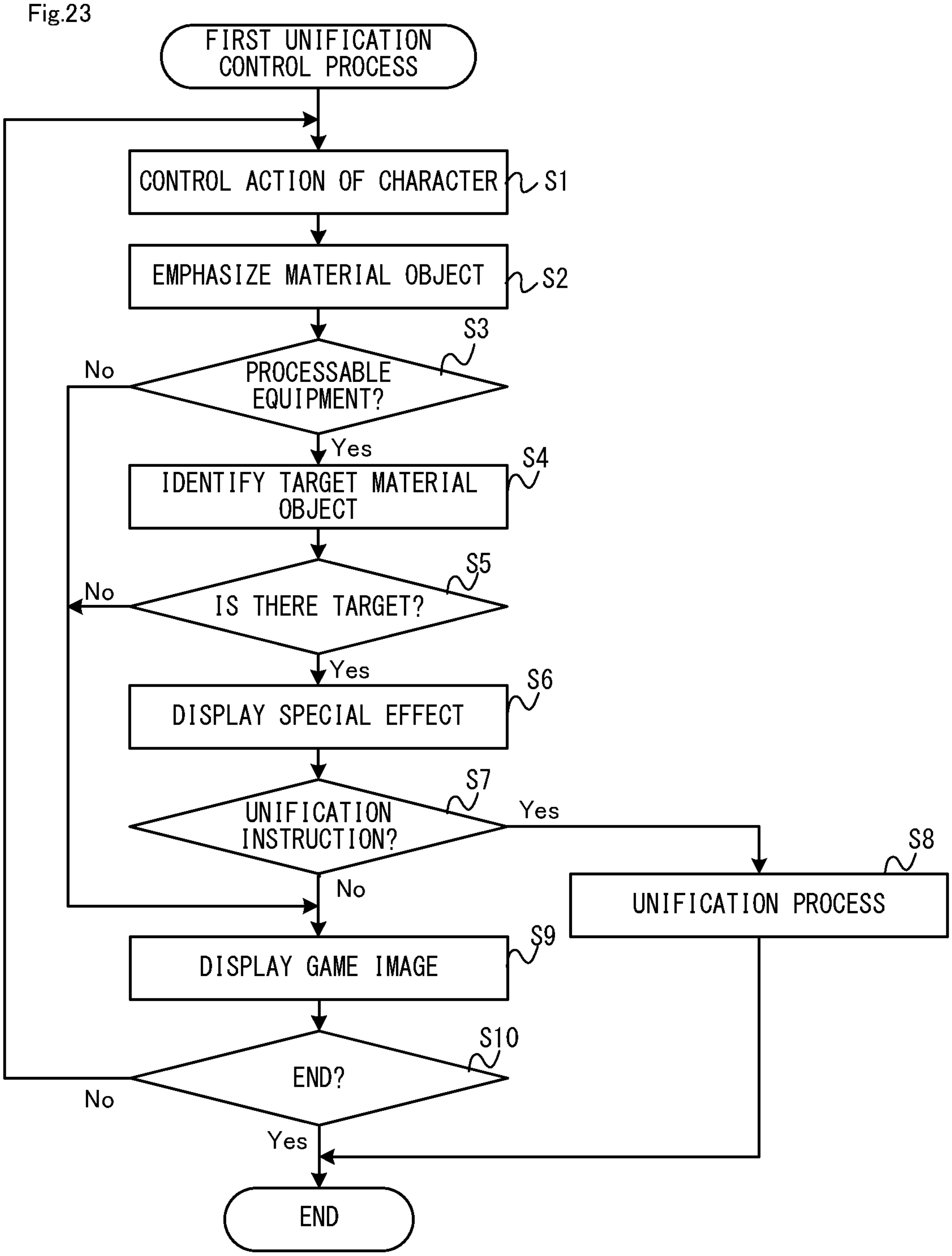
FIG. 23 is a flow chart showing an example of a detailed flow of a unification control process.

FIG. 23 is a flow chart showing an example of a detailed flow of a unification control process. The first unification control process is a process that is executed when a unification item is used by the player character. The unification control process is started upon reaching a state where a unification item is usable for the player character in the game.

In step S1 shown in FIG. 23, the processor 81 controls the action of characters (e.g., the player character or enemy characters) placed on the game field. Specifically, the processor 81 controls the action of the player character based on operation data obtained from the controllers 3 and 4. The actions of the player character include actions of moving around on the game field, taking or releasing the ready position, and using an equipment object, etc. For example, in a ready position in which a close range weapon object is held ready, the processor 81 controls the player character to hold ready a close range weapon object in hand. Moreover, in response to an action instruction given by the player in this state, the processor 81 controls the player character to perform an action of wielding a close range weapon object (thereby attacking an enemy). Note that even when the player character is not holding a close range object ready, if a player instruction to wield the close range weapon object is received, the processor 81 may control the player character to perform an action of wielding the close range object and then take a ready position with the close range object after wielding the close range object. In a ready position with a shield object, the processor 81 controls the player character to hold ready a shield object in hand. Note that in this state, the player character can block attacks from enemy characters. Moreover, in response to an action instruction given by the player in this state, the processor 81 controls the player character to perform an action of thrusting the shield object forward (thereby deflecting an enemy attack). In a ready state where a bow and arrow object is held ready, the processor 81 controls the player character to take a position in which a bow object including an arrow object is held ready in hand. Further, in this state, in response to the player giving a ready-to-shoot instruction, the processor 81 controls the player character in the ready-to-shoot state described above. Then, a shoot preparation process to be described below is executed. In response to the player giving an action instruction in the ready-to-shoot state, the processor 81 controls the player character to perform an action of shooting an arrow object with a bow object.

The processor 81 updates the character data stored in the memory so as to reflect the action of the player character. In response to the item specification instruction, the processor 81 changes an item usable for the player character to the item that is specified by the item specification instruction. Then, the processor 81 updates the in-use item data stored in the memory so as to reflect the change. When the player character newly stores or loses an object as a result of the action by the player character, the processor 81 updates the stored object data stored in the memory so as to include the new object or delete the lost object.

In step S1 described above, the processor 81 places characters other than the player character (e.g., enemy characters), and controls the action of the other characters according to the rules predetermined in the game program. In addition to the process of controlling the action of characters, the game system 1 may execute the process of controlling the movement of a virtual camera used for generating the game image. The process of step S2 is executed, following step S1.

In step S2, the processor 81 changes the setting of the special effect image so that material objects on the game field are emphasized. Thus, in the game image display process (step S9) to be executed next, the game image is displayed in such a manner that material objects are emphasized (see FIG. 9). The process of step S3 is executed, following step S2.

In step S3, based on the equipped object data stored in the memory, the processor 81 determines whether or not the equipment object equipped on the player character is an equipment object that can be used in a unification process. Note that when an equipment object that is not a unified equipment object is included in the equipment objects equipped on the player character, the determination result of step S3 is affirmative. On the other hand, when the equipment objects equipped on the player character are all unified equipment objects, the determination result of step S3 is negative. If the determination result of step S3 is affirmative, the process of step S4 is executed. On the other hand, if the determination result of step S3 is negative, the process of step S9 is executed.

Note that in other embodiments, if the determination result of step S3 is affirmative, the processor 81 may execute the process of step S2. That is, the emphasis of a material object in step S2 may be done only if an equipment object that can be used in a unification process is included in the equipment objects equipped on the player character.

In step S4, the processor 81 identifies a material object to be the target material object from among the material objects on the game field. Note that the target material object is identified according to the method described in "[2-1. Outline of unification process]" above based on the character data (specifically, data representing the position of the player character) stored in the memory. Note that depending on the position of the player character, there may be no target material object, in which case the processor 81 does not identify a target material object in step S4. The process of step S5 is executed, following step S4.

In step S5, the processor 81 determines whether there is a target material object on the game field based on the process result of step S4. If the determination result of step S5 is affirmative, the process of step S6 is executed. On the other hand, if the determination result of step S5 is negative, the process of step S9 is executed.

In step S6, the processor 81 changes the setting of the special effect image so as to display a special effect image (see FIG. 9) that associates together the player character and the target material object. Thus, in the game image display process (step S9) to be executed next, the game image is displayed in such a manner that the special effect image is displayed. Note that if the process of step S6 is not executed in the process loop of steps S1 to S10, a normal game image (i.e., a game image in which the special effect image is not displayed) is displayed in the process of step S9 to be executed next. The process of step S7 is executed, following step S6.

In step S7, based on the operation data obtained from the controllers 3 and 4, the processor 81 determines whether the unification instruction has been given. If the determination result of step S7 is affirmative, the process of step S8 is executed. On the other hand, if the determination result of step S7 is negative, the process of step S9 is executed.

In step S8, the processor 81 executes the unification process. That is, the processor 81 generates a unified equipment object based on a target equipment object, of the equipment objects equipped on the player character, that is specified by a unification instruction and a target material object on the game field. Then, the processor 81 changes the target equipment object equipped on the player character to the unified equipment object (see FIG. 10). Then, the processor 81 updates the equipped object data stored in the memory so as to represent the unified equipment object reflecting the change.

Note that in the unification process of the present embodiment, the objects are controlled so that the target material object is moved closer to the target equipment object, after which the target material object is made to disappear and the target equipment object equipped on the player character 201 is changed to the unified equipment object. Therefore, in the unification process of step S8, the processor 81 repeatedly executes the process of controlling the action described above of the objects and the process of generating and displaying the game image for every passage of a predetermined amount of time (e.g., one frame period). Thus, how the action described above is performed by the unification process is displayed. After step S8, the processor 81 ends the unification control process shown in FIG. 23.

In step S9, the processor 81 generates a game image representing the game field in which characters and objects are placed, and displays the game image on the display 12. In this process, the processor 81 generates the game image so as to reflect (a) the status of each character (e.g., positions of the player character and enemy characters, etc.), (b) the placement of the objects on the game field, and (c) the setting of the special effect image, as determined in the process of steps S1 to S7. Note that in the present embodiment, the process of step S9 is repeatedly executed at a rate of once per a predetermined amount of time (e.g., 1 frame period). The process of step S10 is executed, following step S9.

In step S10, the processor 81 determines whether or not to end the first unification control process. For example, the processor 81 determines to end the unification control process when the state in which the player character can use the unified item is released during the unification control process. On the other hand, if the above state is maintained, the processor 81 determines not to end the unification control process. If the determination result of step S10 is negative, the process of step S1 is executed again. Thereafter, the series of processes of steps S1 to S10 is repeatedly executed until the process of step S8 is executed or it is determined to end the unification control process. On the other hand, if the determination result of step S10 is affirmative, the processor 81 ends the first unification control process shown in FIG. 23.

Note that although not shown in the figures, while executing the process of controlling the action of the player character, including during the unification process described above, the processor 81 determines whether or not the player character has released the ready state with an arrow object (which may be a unified equipment object or may be an equipment object that is not a unified equipment object). This determination can be made based on the character data stored in the memory. When the player character releases the ready state with an arrow object, the processor 81 stores, in the memory, data representing the arrow object at the time when the player character releases the ready state. Then, when the player character thereafter again takes the ready state with the arrow object, the processor 81 controls the action so that the arrow object represented by the stored data is held ready by the player character. Thus, the player character again holds ready the arrow object that the player character was previously holding ready. That is, when the arrow object at the time when the player character releases the ready state is a unified equipment object, the arrow object at the time when the player character again takes the ready state with an arrow object is the unified equipment object.

Figure 24:
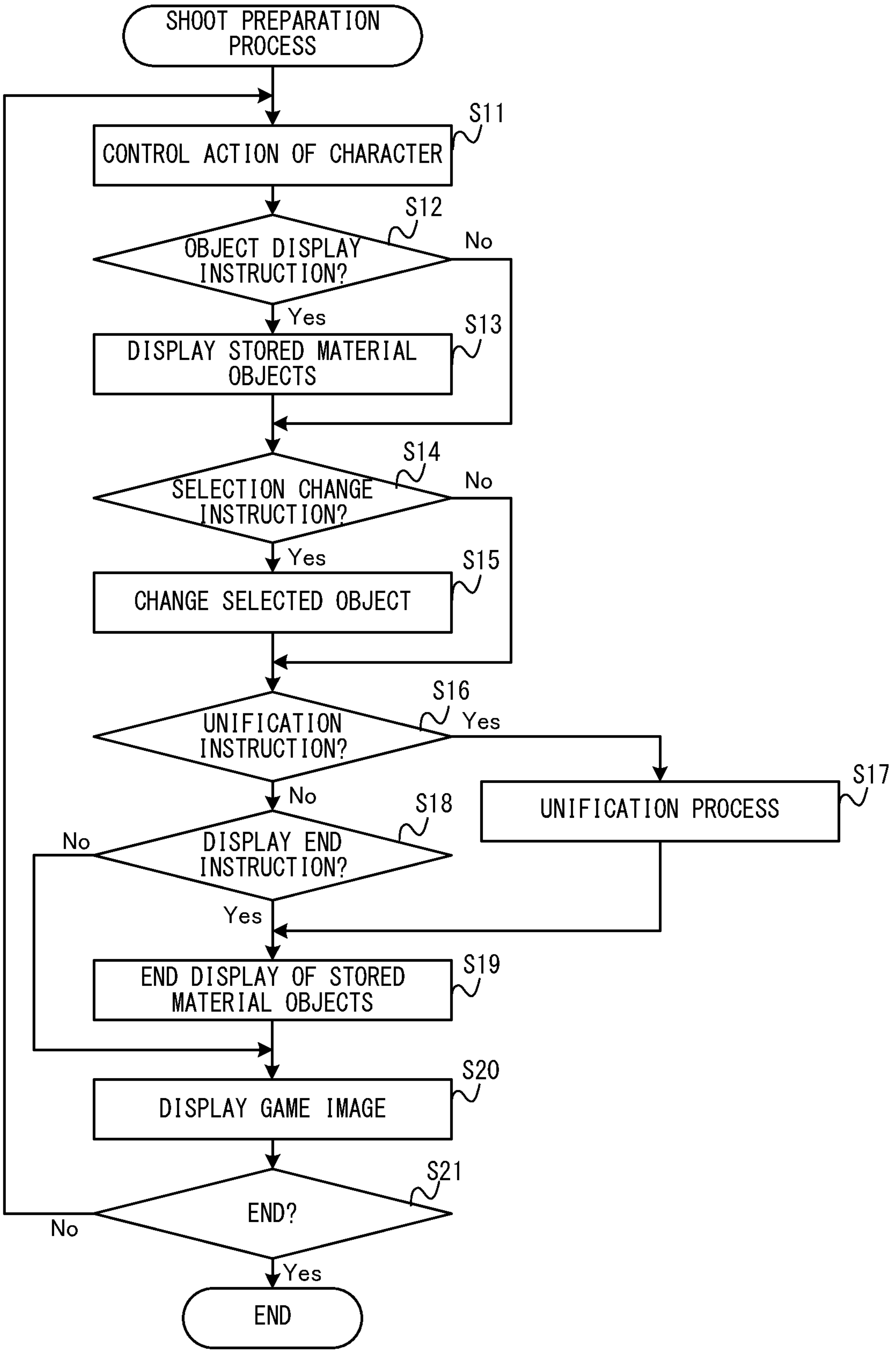
FIG. 24 is a flow chart showing an example of a detailed flow of a shoot preparation process.

FIG. 24 is a sub-flow chart showing an example of the detailed flow of the shoot preparation process. The shoot preparation process is a process to be executed when unification is performed when the player character is brought to the ready-to-shoot state. The shoot preparation process is started in response to the player giving an instruction to bring the player character to the ready-to-shoot state during the game. Note that in the present embodiment, the shoot preparation process is started whether or not the player character can use a unified item. As will be described below, the player character is allowed to perform unification by being in the ready-to-shoot state.

In step S11 shown in FIG. 24, the processor 81 controls the action of characters (e.g., the player character or enemy characters) placed on the game field. The process of step S11 is similar to the process of step S1 described above. Note that in step S11, since the player character is in the ready-to-shoot state, the processor 81 performs a control of moving the player character while in a position where the player character is nocking the arrow object. In response to an action instruction given by the player, the processor 81 controls the player character to perform the action of shooting an arrow object with a bow object. The process of step S12 is executed, following step S11.

In step S12, the processor 81 determines whether the object display instruction described above has been performed based on the operation data obtained from the controllers 3 and 4. If the determination result of step S12 is affirmative, the process of step S13 is executed. On the other hand, if the determination result of step S12 is negative, the process of step S14 is executed, skipping the process of step S13.

In step S13, the processor 81 changes the display settings so that the stored material object image described above is displayed. Thus, the game image is displayed in such a manner that the stored material object image is included (see FIG. 17). Note that the settings for displaying the stored material object image are maintained until the display settings are changed in step S19 to be described below or until the player character releases the ready-to-shoot state. The process of step S14 is executed, following step S13.

In step S14, the processor 81 determines whether a selection change instruction to change the stored material object image being selected from among the stored material object images displayed has been given based on the operation data obtained from the controllers 3 and 4. If the determination result of step S14 is affirmative, the process of step S15 is executed. On the other hand, if the determination result of step S14 is negative, the process of step S16 is executed, skipping the process of step S15.

In step S15, the processor 81 brings a stored material object image that is specified by the selection change instruction to a selected state. In this process, the processor 81 changes the display settings so that the stored material object image being selected is displayed in a different manner from the stored material object images being not selected. The process of step S16 is executed, following step S15.

In step S16, based on the operation data obtained from the controllers 3 and 4, the processor 81 determines whether a unification instruction described above has been given. If the determination result of step S16 is affirmative, the process of step S17 is executed. On the other hand, if the determination result of step S16 is negative, the process of step S18 is executed, skipping the process of step S17.

In step S17, the processor 81 executes the unification process. Note that in step S17, as opposed to step S8 described above, the processor 81 generates a unified arrow object based on an arrow object equipped on the player character and a material object that is represented by the stored material object image selected. Then, the processor 81 changes the arrow object equipped on the player character to the unified arrow object (see FIG. 18). In this process, the processor 81 updates the equipped object data stored in the memory so as to represent the unified arrow object reflecting the change. The process of step S17 is executed, following step S19.

In step S18, based on the operation data obtained from the controllers 3 and 4, the processor 81 determines whether a display end instruction to end the display of the stored material object image has been performed. If the determination result of step S18 is affirmative, the process of step S19 is executed. On the other hand, if the determination result of step S18 is negative, the process of step S20 is executed.

In step S19, the processor 81 ends the display setting in which the stored material object image is displayed. Thus, the game image is displayed in such a manner that the stored material object image is not included. After step S19, the process of step S20 is executed.

In step S20, the processor 81 generates a game image representing the game field in which characters and objects are placed, and displays the game image on the display 12.

The process of step S20 is similar to the process of step S9 described above. Specifically, the processor 81 generates the game image so as to reflect (a) the status of each character, (b) the placement of objects on the game field, and (c) the display setting, as determined in the process of steps S11 to S19. Note that in the present embodiment, the process of step S20 is repeatedly executed at a rate of once per a predetermined amount of time (e.g., 1 frame period). The process of step S20 is executed, following step S21.

In step S21, the processor 81 determines whether or not to end the shoot preparation process. For example, the processor 81 determines to end the shoot preparation process when the player gives an instruction to release the ready-to-shoot state or a shooting instruction. On the other hand, when no such instruction is given, the processor 81 determines not to end the shoot preparation process. When the determination result of step S21 is negative, the process of step S11 is executed again. Thereafter, the series of processes of steps S11 to S21 is repeatedly executed until it is determined to end the shoot preparation process. On the other hand, when the determination result of step S21 is affirmative, the processor 81 ends the shoot preparation process. In such a case, the player character returns to a state in which the player character holds a bow and arrow object ready.

Figure 25:
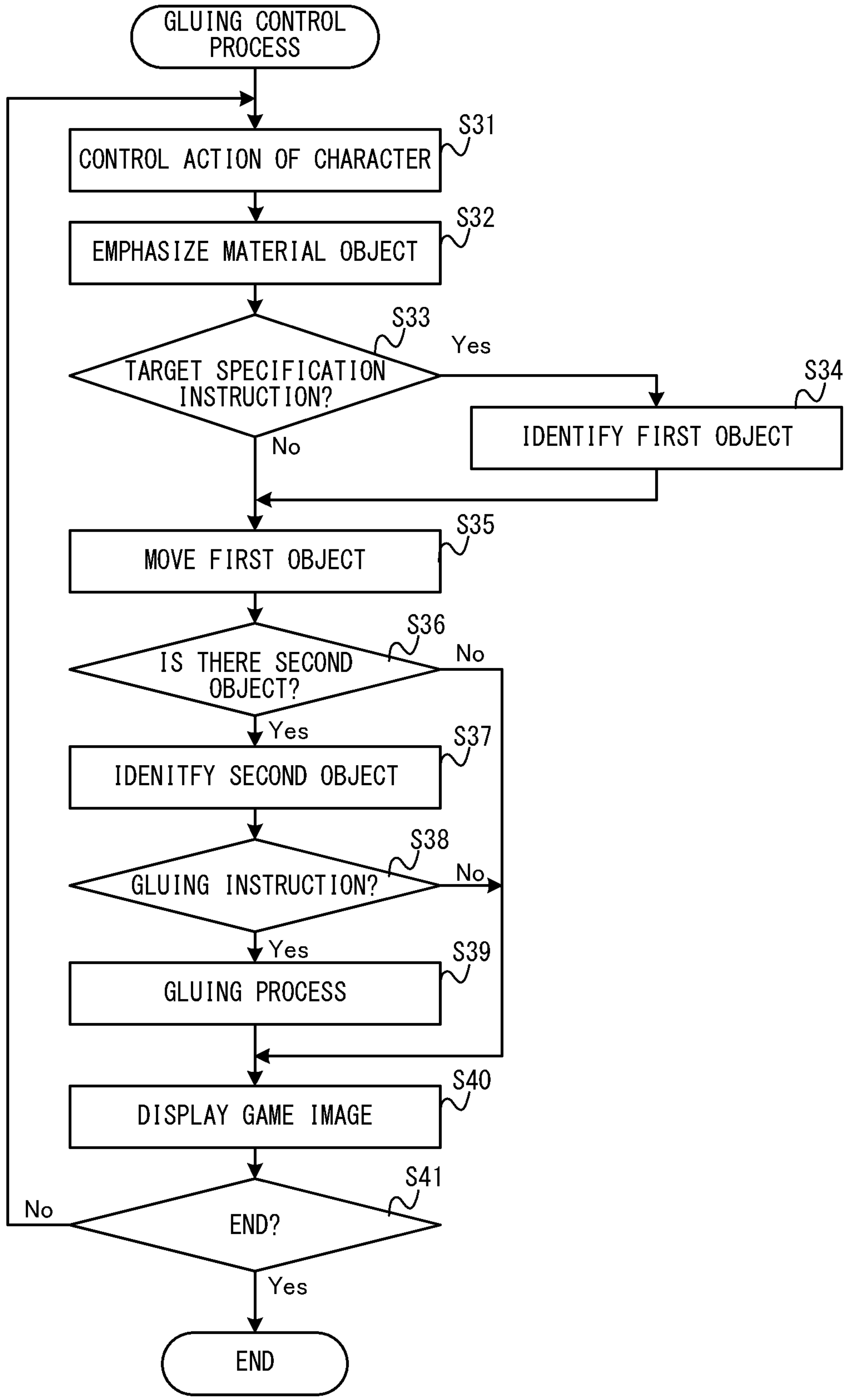
FIG. 25 is a flow chart showing an example of a detailed flow of a gluing control process.

FIG. 25 is a flow chart showing an example of a detailed flow of a gluing control process. The gluing control process is a process that is executed when the player character uses a gluing item. The gluing control process is started upon reaching a state where a gluing item is usable for the player character in the game.

In step S31 shown in FIG. 25, the processor 81 controls the action of characters (e.g., the player character or enemy characters) placed on the game field. The process of step S31 is similar to the process of step S1 described above. The process of step S32 is executed, following step S31.

In step S32, the processor 81 updates the game image so that material objects on the game field are emphasized. The process of step S32 may be similar to the process of step S2 described above. Note however that the processor 81 may vary the manner of display of emphasizing material objects (e.g., the color) between the process of step S2 and the process of step S32. The process of step S33 is executed, following step S32.

In step S33, the processor 81 determines whether the target specification instruction has been given based on the operation data obtained from the controllers 3 and 4. If the determination result of step S33 is affirmative, the process of step S34 is executed. On the other hand, if the determination result of step S33 is negative, the process of step S35 is executed, skipping the process of step S34.

In step S34, the processor 81 identifies a first gluing target object based on the target specification instruction. That is, the processor 81 sets the material object specified by the target specification instruction as the first gluing target object. The processor 81 updates the game image so as to display a special effect image that associates together a gluing item that is put on the player character and the first gluing target object (see FIG. 19). The process of step S35 is executed, following step S34.

In step S35, the processor 81 moves the first gluing target object. Specifically, as described in "[2-7. Gluing process of object]" above, the processor 81 moves the first gluing target object according to the position and/or direction of the player character and the distance change instruction given by the player. In this process, the processor 81 updates the placed object data stored in the memory so as to represent the data reflecting the change. The process of step S36 is executed, following step S35.

In step S36, the processor 81 determines whether there is a second gluing target object. Specifically, the processor 81 determines whether a material object is present within a predetermined distance from the first gluing target object. If the determination result of step S36 is affirmative, the process of step S37 is executed. On the other hand, if the determination result of step S36 is negative, the process of step S40 is executed.

In step S37, the processor 81 identifies the second gluing target object. Specifically, the processor 81 sets, as the second gluing target object, one of the material objects present within the predetermined distance from the first gluing target object that is located closest to the first gluing target object. The processor 81 updates the game image so as to display a special effect image that associates together the first gluing target object and the second gluing target object (see FIG. 20). The process of step S38 is executed, following step S37.

In step S38, the processor 81 determines whether the gluing instruction described above has been given based on the operation data obtained from the controllers 3 and 4. If the determination result of step S38 is affirmative, the process of step S39 is executed. On the other hand, if the determination result of step S38 is negative, the process of step S40 is executed.

In step S39, the processor 81 executes the gluing process. That is, the processor 81 executes the gluing process of gluing together the first gluing target object and the second gluing target object (see "[2-7. Gluing process of object]" above). In this process, the processor 81 updates the placed object data stored in the memory so as to reflect the gluing process. The process of step S40 is executed, following step S39.

In step S40, the processor 81 generates a game image representing the game field in which characters and objects are placed, and displays the game image on the display 12. The process of step S40 is similar to the process of step S9 described above. Specifically, the processor 81 generates the game image so as to reflect (a) the status of each character, (b) the placement of objects on the game field, and (c) the display setting, as determined in the process of steps S31 to S39. Note that in the present embodiment, the process of step S40 is repeatedly executed at a rate of once per a predetermined amount of time (e.g., 1 frame period). The process of step S41 is executed, following step S40.

In step S41, the processor 81 determines whether or not to end the gluing control process. For example, when the state where a gluing item is usable for the player character is released during the gluing control process or when the gluing process in step S39 described above has been executed, the processor 81 determines to end the gluing control process. On the other hand, if the above state is maintained and the gluing process has not been executed, the processor 81 determines not to end the gluing control process. If the determination result of step S41 is negative, the process of step S31 is executed again. Thereafter, the series of processes of steps S31 to S41 is repeatedly executed until it is determined to end the gluing control process. On the other hand, if the determination result of step S41 is affirmative, the processor 81 ends the gluing control process.

Figure 26:
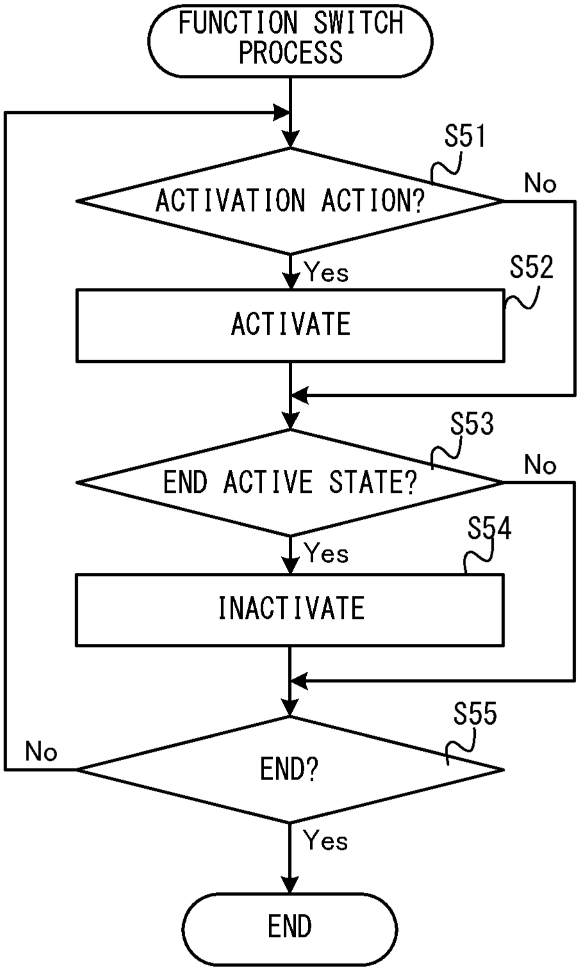
FIG. 26 is a flow chart showing an example of a detailed flow of a function switching process.

FIG. 26 is a flow chart showing an example of a detailed flow of a function switching process. The function switching process is a process that is executed when the player character is equipped with a unified equipment object based on the switch function object. The function switching process is started when the player character is equipped with a unified equipment object based on the switch function object in the game. Note that the function switching process may be executed in parallel when the processes shown in FIG. 23 to FIG. 25 are executed.

In step S51 shown in FIG. 26, the processor 81 determines whether the player character has performed the action to activate the unified equipment object based on the function switching object. Note that this determination is made based on the character data that is updated in step S1, S11 or S31 described above. If the determination result of step S51 is affirmative, the process of step S52 is executed. On the other hand, if the determination result of step S51 is negative, the process of step S53 is executed, skipping the process of step S52.

In step S52, the processor 81 sets, in the active state, the unified equipment object equipped on the player character. Thus, the function of the unified equipment object is exerted. While the unified equipment object is in the active state, the actions of the characters are controlled taking into consideration the function of the unified equipment object in step S1, S11 or S31 described above. The process of step S53 is executed, following step S52.

In step S53, the processor 81 determines whether or not to end the active state of the unified equipment object equipped on the player character. Specifically, where the unified equipment object is a type of an object that maintains the active state for a predetermined period from the start, the processor 81 determines whether the predetermined period has elapsed. Where the unified equipment object is a type of an object of which the active state is ended in response to a predetermined action performed by the player character, the processor 81 determines whether the predetermined action has been performed. If the determination result of step S53 is affirmative, the process of step S54 is executed. On the other hand, if the determination result of step S53 is negative, the process of step S55 is executed, skipping the process of step S54.

In step S54, the processor 81 sets, in the inactive state, the unified equipment object equipped on the player character. Thus, the state where the function of the unified equipment object is exerted ends. The process of step S55 is executed, following step S54.

In step S55, the processor 81 determines whether or not to end the function switching process. For example, the processor 81 determines to end the function switching process when the player character takes off the unified equipment object based on the switch function object during the function switching process. When the player character is equipped with the unified equipment object based on the switch function object, the processor 81 determines not to end the function switching process. If the determination result of step S55 is negative, the process of step S51 is executed again. Thereafter, the series of processes of steps SM to S55 is repeatedly executed until it is determined to end the function switching process. Note that the series of processes of steps S51 to S55 is repeatedly performed at a rate of once per a predetermined amount of time (e.g., 1 frame period). On the other hand, if the determination result of step S55 is affirmative, the processor 81 ends the function switching process.

Figure 27:
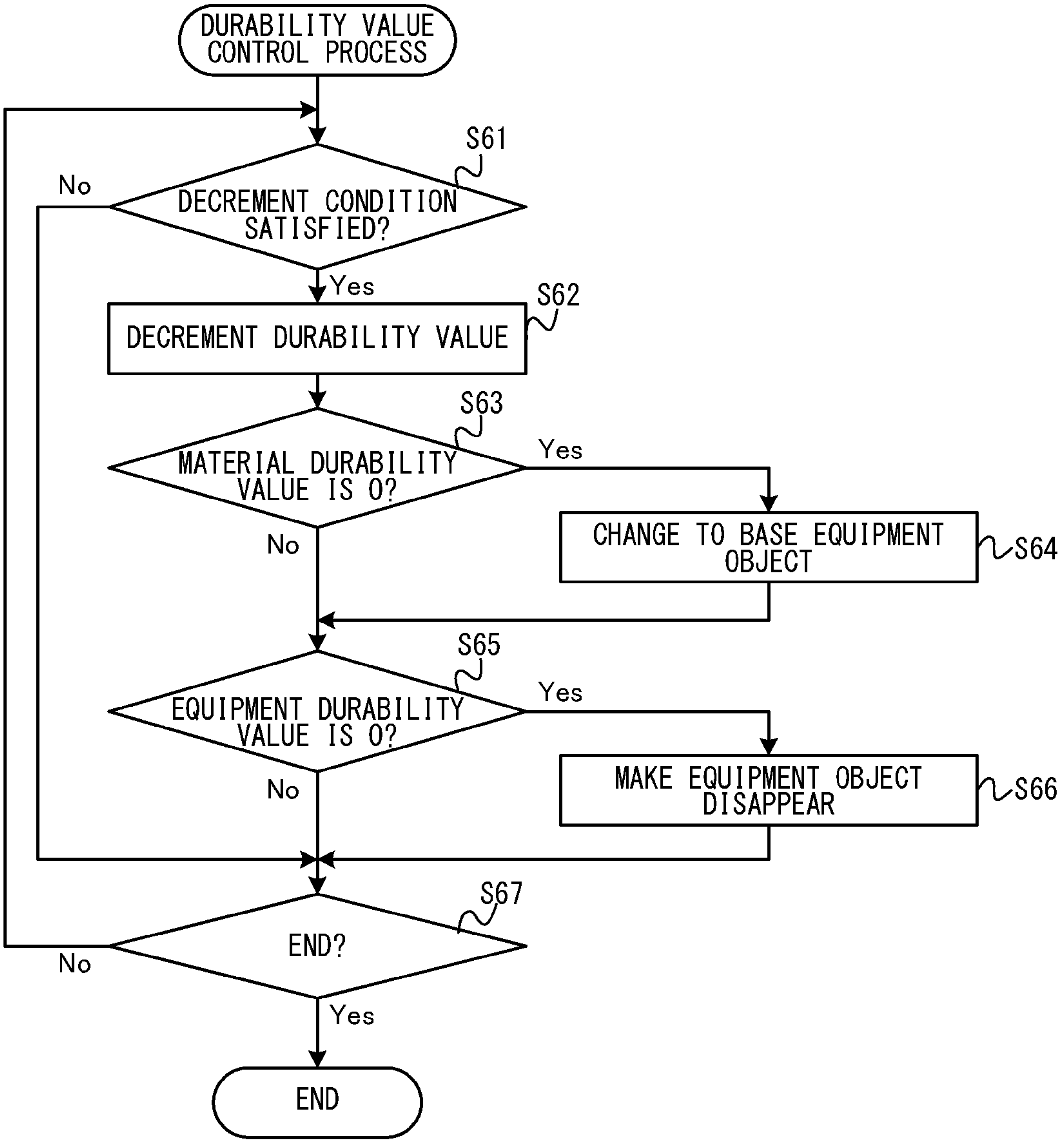
FIG. 27 is a flow chart showing an example of a detailed flow of a durability value control process.

FIG. 27 is a flow chart showing an example of a detailed flow of a durability value control process. The durability value control process is a process of calculating a durability value that is assigned to an equipment object equipped on the player character (specifically, an equipment durability value and a material durability value), and making the equipment object disappear depending on the durability value. The durability value control process is started in response to the player character taking a ready position with an equipment object in the game. Note that the durability value control process may be executed in parallel when the processes shown in FIG. 23 to FIG. 26 are executed.

In step S61 shown in FIG. 27, the processor 81 determines whether a decrement condition for decrementing the durability value is satisfied. For example, the decrement condition may be a condition that the player character has performed an action using the equipment object or may be each time a predetermined amount of time has elapsed while there is an equipment object that is on fire (see "[2-4. Durability value of object]" above). If the determination result of step S61 is affirmative, the process of step S62 is executed. On the other hand, if the determination result of step S61 is negative, the process of step S67 to be described below is executed.

In step S62, the processor 81 decrements the durability value of the equipment object equipped on the player character. Specifically, the processor 81 decrements by 1 the equipment durability value assigned to the equipment object, and if the equipment object is assigned a material durability value, decrements the material durability value by 1. Then, the processor 81 updates the durability value data included in the owned object data stored in the memory so as to reflect the decrement. The process of step S63 is executed, following step S62.

In step S63, the processor 81 determines whether the material durability value assigned to the equipment object being equipped on the player character has reached 0. This determination is made based on the durability value data representing the material durability value included in the stored object data stored in the memory. Note that when the equipment object being equipped on the player character is not assigned a material durability value (e.g., the equipment object being equipped is not a unified equipment object), the processor 81 determines that the material durability value has not reached 0. If the determination result of step S63 is affirmative, the process of step S64 is executed. On the other hand, if the determination result of step S63 is negative, the process of step S65 is executed, skipping the process of step S64.

In step S64, the processor 81 changes the equipment object equipped on the player character from the unified equipment object whose material durability value has reached 0 to the base equipment object of the unified equipment object. Therefore, the unified equipment object disappears and the base equipment object is revived. Then, the processor 81 updates the equipped object data stored in the memory so as to reflect the change. The process of step S65 is executed, following step S64.

In step S65, the processor 81 determines whether the equipment durability value assigned to the equipment object being equipped on the player character has reached 0. This determination is made based on the durability value data representing the equipment durability value included in the stored object data stored in the memory. Note that when the equipment object being equipped on the player character is not assigned an equipment durability value, the processor 81 determines that the equipment durability value has not reached 0. If the determination result of step S65 is affirmative, the process of step S66 is executed. On the other hand, if the determination result of step S66 is negative, the process of step S69 is executed, skipping the process of step S67.

In step S66, the processor 81 makes the equipment object equipped on the player character disappear. Then, since the player character releases the ready position, the processor 81 updates the character data stored in the memory so as to reflect the release of the ready position. The processor 81 updates the stored object data stored in the memory so as to delete the equipment object. The process of step S67 is executed, following step S66.

In step S67, the processor 81 determines whether or not to end the durability value control process. For example, the processor 81 determines to end the durability value control process when the player character releases the ready position during the durability value control process. When the player character maintains the ready position, the processor 81 determines not to end the durability value control process. If the determination result of step S67 is negative, the process of step S61 is executed again. Thereafter, the series of processes of steps S61 to S67 is repeatedly executed until it is determined to end the durability value control process. Note that the series of processes of steps S61 to S67 is repeatedly executed at a rate of once per a predetermined amount of time (e.g., 1 frame period). On the other hand, if the determination result of step S67 is affirmative, the processor 81 ends the durability value control process.

4. Functions/Effects and Variations of Present Embodiment

As described above, in the embodiment described above, the game program causes a computer (e.g., the processor 81) of an information processing apparatus (e.g., the main body unit 2) to function as the following elements:

a display controller (step S9, S22) configured to display, on a display device, the game image including a virtual game field where a player character controlled by the player is placed an object generator (step S8,S19) configured to generate a unified equipment object based on an equipment object that can be equipped on the player character and a material object, wherein the unified equipment object has an external appearance obtained by unifying together the equipment object and the material object When a unification instruction is given by the player while in a state where the display device is displaying a scene where the player character equipped with an equipment object and a material object are placed on the game field, the object generator generates a unified equipment object based on the equipment object equipped on the player character and the material object placed on the game field. In this case, the display controller updates the game image so as to make the material object placed on the game field disappear and change the equipment object equipped on the player character on the game field to the unified equipment object (FIG. 10).

With such a configuration, in response to a unification instruction by the player, the game image is updated so as to make the material object on the game field disappear and change the equipment object equipped on the player character. Thus, the relationship between a new equipment object (i.e., a unified equipment object) and the base objects used for the generation thereof can be presented to the player in an easy-to-understand manner.

Note that "updating the game image so as to make the material object placed on the game field disappear and change the equipment object equipped on the player character on the game field to the unified equipment object" may be realized by either the process (a) or the process (b) below.

(a) the process of deleting the material object from the game field and making a unified equipment object composed of a different polygon model from the polygon model of the material object (the process employed in the embodiment described above) appear in the game field.

(b) the process of making a unified equipment object obtained by using at least a portion of the polygon model of the material object and at least a portion of the polygon model of the equipment object (specifically, a unified equipment object whose polygon model is composed of at least a portion of the polygon model of the material object and at least a portion of the polygon model of the equipment object) appear in the game field.

Also by the process (b), as in the embodiment described above, it is possible to show how a unified equipment object based on a material object and an equipment object is generated while the material object is made to disappear. The meaning of the phrase "make a material object disappear" as used herein does not exclude the use of the material object as a part of another object (specifically, a unified equipment object) after the material object is made to disappear.

Note that where the process (b) is used, the game system 1 can realize the function to be added to the unified equipment object (e.g., the function of generating propulsion, the function of throwing a flame, etc.) by using the function assigned to the base material object as it is.

Note that while it is assumed in the embodiment described above that a unified equipment object is generated as the player character uses a unification item in the game, the use of a unification item by the player character does not need to be the precondition for the generation of a unified equipment object. That is, in other embodiments, the game system 1 may accept the unification instruction described above from the player, irrespective of whether the player character owns a particular item.

In the embodiment described above, the unification instruction is not an instruction given on the menu screen displayed on the display device. That is, in the embodiment described above, the player does not perform such an input operation of making an input of selecting an equipment object and a material object on the menu screen and further making an input to given an instruction to generate a unified equipment object. Rather, the player gives a unification instruction by performing a predetermined input (e.g., pressing a predetermined button on the controller 3 or 4) while in a state where the game image representing the game field is displayed. Therefore, in the embodiment described above, the player can give a unification instruction while controlling the player character on the game field, and it is possible to reduce operations that need to be performed for generating a unified equipment object.

Note that in the embodiment described above, an instruction to specify a target equipment object to be used in a unification process is an instruction for the player character to take a ready position with the target equipment object (see "[2-1. Outline of unification process]" above). In the embodiment described above, since the target material object is determined based on the position of the player character (see "[2-1. Outline of unification process]" above), it can be said that an instruction to specify a target material object to be used in a unification process is an instruction to move the player character on the game field. Therefore, in the embodiment described above, instructions to specify a target equipment object and a target material object are not instructions to be given on the menu screen but are instructions for the player character to perform actions. Thus, in addition to a unification instruction, the player can also give instructions to specify a target equipment object and a target material object while controlling the player character on the game field. Therefore, it is possible to further reduce operations that need to be performed for generating a unified equipment object.

Note that in other embodiments, the game system does not need to include some of the components of the embodiment described above and does not need to execute some of the processes that are executed in the embodiment described above. For example, in order to realize a specific one of the advantageous effects of the embodiment described above, the game system may include a component or components for realizing the specific advantageous effect and execute a process or processes for realizing the specific advantageous effect, and the game system does not need to include other components and does not need to execute other processes. For example, in other embodiments, a unified equipment object may have an external appearance a portion of which is different from either the external appearance of the base material object or the external appearance of the base equipment object, or may have an external appearance that is entirely different therefrom. Alternatively, it may be an external appearance that is substantially the same as the external appearance of the base material object or the external appearance of the base equipment object.

The embodiment described above can be used in, for example, a game system or a game program, etc., with the aim of presenting, to the player in an easy-to-understand manner, the relationship between equipment and base objects used for the generation thereof, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program executable by a processor in an information processing apparatus to perform operations comprising:

generating, for display on a display device, a game image including a virtual game field in which a player character controllable by a player is placed; and when a unification instruction is given by the player while the player character is equipped with an equipment object and a material object is placed in the game field, generating a unified equipment object based on the equipment object and the material object, the unified equipment object having a player-perceivable appearance that combines a visual aspect of the equipment object and a visual aspect of the material object, and updating the game image so as to make the material object placed in the game field disappear and change the equipment object to the unified equipment object so that the player character is equipped with the unified equipment object.

2. The non-transitory computer-readable storage medium according to claim 1, wherein the operations further comprise generating the unified equipment object by using another equipment object placed in the game field as the material object.

3. The non-transitory computer-readable storage medium according to claim 1, wherein the unified equipment object is generatable based on for any combination of candidate material objects and candidate equipment objects.

4. The non-transitory computer-readable storage medium according to claim 1, wherein the operations further comprise when a predetermined condition is satisfied, making the unified equipment object disappear, and making a base equipment object of the unified equipment object appear in the game without making a base material object of the unified equipment object appear in the game.

5. The non-transitory computer-readable storage medium according to claim 4, wherein the operations further comprising if an equipment durability value assigned to the unified equipment object indicates that a durability thereof has exhausted, making the unified equipment object disappear, without making the base equipment object and the base material object of the unified equipment object appear in the game.

6. The non-transitory computer-readable storage medium according to claim 4, wherein:

the player character is able to carry around an object from the game field that is stored by the player character;

the unified equipment object is generated by using, as the material object, an unstorable object that is not settable in a state of being stored by the player character; and the operations further comprise setting the unified equipment object in a state of being stored by the player character.

7. The non-transitory computer-readable storage medium according to claim 1, wherein:

the equipment object includes a projectile object and a projectile weapon object configured to shoot the projectile object;

when the unification instruction is given while in a state where the player character is ready to shoot the projectile object with the projectile weapon object and where one of a plurality of material objects stored by the player character is being selected, a unified projectile object that represents a projectile obtained by unifying together the projectile object and the selected material object is generated;

the game image is updated so as to change the projectile object, of the equipment objects equipped on the player character in the game field, to the unified projectile object; and the unified projectile object is not settable in a state of being stored by the player character.

8. The non-transitory computer-readable storage medium according to claim 1, wherein the operations further comprise:

assigning a material durability value to the unified equipment object if the material object is assigned a durability value; and if the material durability value assigned to the unified equipment object equipped on the player character indicates that a durability thereof has exhausted, making the unified equipment object disappear and generating a base equipment object of the unified equipment object.

9. The non-transitory computer-readable storage medium according to claim 1, wherein:

the material object is a switch function object configured to take an active state in which a predetermined function of the material object is exerted in the game field and an inactive state in which the predetermined function is not exerted in the game field; and the operations further comprise controlling the unified equipment object to exert the predetermined function in response to the player character performing a predetermined action using the unified equipment object that is based on the switch function object.

10. The non-transitory computer-readable storage medium according to claim 1, wherein:

the material object is a propulsion object that has a function of generating propulsion; and the operations further comprise when the player character is equipped with the unified equipment object that is based on the propulsion object, generating propulsion to at least one of the unified equipment object and the player character so as to move the player character in the game field.

11. The non-transitory computer-readable storage medium according to claim 1, wherein the unified equipment object has an external appearance including at least a portion of an external appearance of a base equipment object of the unified equipment object and at least a portion of an external appearance of a base material object of the unified equipment object.

12. The non-transitory computer-readable storage medium according to claim 11, wherein the unified equipment object has an external appearance obtained by replacing a portion of the external appearance of the base equipment object of the unified equipment object with a portion or whole of the external appearance of the base material object of the unified equipment object.

13. The non-transitory computer-readable storage medium according to claim 11, wherein the unified equipment object has an external appearance obtained by replacing a portion of the external appearance of the base equipment object of the unified equipment object with a portion or whole of the external appearance of a shrunk version of the base material object of the unified equipment object.

14. The non-transitory computer-readable storage medium according to claim 11, wherein:

a first equipment object includes a projectile object and a projectile weapon object configured to shoot the projectile object;

the operations further comprise generating a unified projectile object that represents a projectile obtained by unifying together the projectile object included in the first equipment object and a predetermined material object;

the unified projectile object has an external appearance obtained by replacing a portion of an external appearance of the base projectile object of the unified projectile object with a portion or whole of an external appearance of the predetermined base material object of the unified projectile object; and the unified equipment object, which is generated based on a second equipment object that does not include the projectile object and the predetermined material object, has an external appearance obtained by replacing a portion of an external appearance of the second equipment object with a portion or whole of an external appearance of a shrunk version of the predetermined material object.

15. The non-transitory computer-readable storage medium according to claim 1, wherein when the unification instruction is given while in a state where the display device is displaying a scene where the player character equipped with the equipment object and the material object is placed in the game field, the game image is updated so as to move the material object closer to the player character and then change the equipment object equipped on the player character to the unified equipment object.

16. The non-transitory computer-readable storage medium according to claim 1, wherein the unified equipment object is generated based on a material object, from among a plurality of material objects placed in the game field, that is within a predetermined distance from a position of the player character or a position of the equipment object equipped on the player character.

17. The non-transitory computer-readable storage medium according to claim 16, wherein the unified equipment object is generated based on the equipment object equipped on the player character and one of the material objects placed within a certain range in the game field that is determined based on the position of the player character or the equipment object and a direction of the player character or the equipment object.

18. The non-transitory computer-readable storage medium according to claim 16, wherein the operations further comprise in a state where the display device is displaying a scene in which the player character is equipped with an equipment object and one or more material objects are placed in the game field, adding a specification image to one of the material objects that satisfies a predetermined criterion.

19. The non-transitory computer-readable storage medium according to claim 1, wherein:

the player character is able to be simultaneously equipped with a plurality of equipment objects; and the unified equipment object is generated based on the material object and one of the plurality of equipment objects that is being equipped on the player character and that is specified by the player.

20. The non-transitory computer-readable storage medium according to claim 19, wherein the operations further comprise:

making the player character perform an action of holding ready one of a plurality of equipment objects being equipped on the player character, wherein the one of the plurality of equipment objects is specified by the player; and generating the unified equipment object based on an equipment object that the player character is holding ready and the material object.

21. The non-transitory computer-readable storage medium according to claim 19, wherein the operations further comprise:

in a state where the display device is displaying a scene in which the player character equipped with the equipment object and the material object are placed in the game field, displaying, on the display device, a specification image that associates together the equipment object equipped on the player character and the material object; and when the unification instruction is given while in a state where the specification image is displayed, the processor generates the unified equipment object based on the equipment object and the material object that are associated together by the specification image.

22. The non-transitory computer-readable storage medium according to claim 19, wherein:

an image of choices representing the plurality of equipment objects is displayed on the display device when the material object is arranged within a predetermined distance from a position of the player character and when the unified equipment object is able to be generated; and the unified equipment object is generated based on the material object and one equipment object that is specified by the player from among the choices.

23. The non-transitory computer-readable storage medium storage medium according to claim 19, wherein:

a specification image that associates together the player character and the material object is displayed on the display device in a state where a scene where the player character and the material object are placed in the game field is displayed on the display device; and when the unification instruction is given in a state where the specification image is displayed, the unified equipment object is generated based on the equipment object and the material object that are associated together by the specification image.

24. The non-transitory computer-readable storage medium according to claim 1, wherein the operations further comprise when a gluing instruction is given by the player while in a state where a plurality of material objects are placed in the game field, placing, in the game field, a glued object obtained by gluing together the material objects.

25. The non-transitory computer-readable storage medium according to claim 24, wherein when the gluing instruction is given while in a state where a plurality of objects including the equipment object are placed in the game field, the glued object obtained by gluing together the equipment object and another object is placed in the game field.

26. The non-transitory computer-readable storage medium according to claim 24, wherein:

a new glued object, which is obtained by gluing together a plurality of material objects, is placed in the game field, the new glued object being obtained by gluing together the glued object, and the material object placed in the game field; and the unified equipment object is not generated based on the unified equipment object equipped on the player character and the material object placed in the game field.

27. The non-transitory computer-readable storage medium according to claim 24, wherein:

the glued object is splittable into base objects thereof in response to a release instruction given by the player; and the unified equipment object is not splittable into a base equipment object and a base material object thereof in response to an instruction given by the player.

28. The non-transitory computer-readable storage medium according to claim 24, wherein:

the unified equipment object is generated by securing together the equipment object and the material object in a predetermined positional relationship; and the glued object is generated by securing together material objects in a positional relationship that is determined based on a position and attitude of each material object at the time of gluing.

29. The non-transitory computer-readable storage medium according to claim 1, wherein the operations further comprise placing, in the game field, a character that is a non-player character not controlled by the player and that is equipped with another unified equipment object.

30. An information processing apparatus, comprising:

a memory storing a program executable by a processor of the information processing apparatus to perform operations comprising:

generating, for display on a display device, a game image including a virtual game field in which a player character controllable by a player is placed; and when a unification instruction is given by the player while the player character is equipped with an equipment object and a material object is placed in the game field, generating a unified equipment object based on the equipment object and the material object, the unified equipment object having a player-perceivable appearance that combines a visual aspect of the equipment object and a visual aspect of the material object, and updating the game image so as to make the material object placed in the game field disappear and change the equipment object to the unified equipment object so that the player character is equipped with the unified equipment object.

31. An information processing system, comprising:

a processor and a memory coupled thereto, the processor and the memory cooperating to perform functionality comprising:

generating, for display on a display device, a game image including a virtual game field in which a player character controllable by a player is placed; and when a unification instruction is given by the player while the player character is equipped with an equipment object and a material object is placed in the game field, generating a unified equipment object based on the equipment object and the material object, the unified equipment object having a player-perceivable appearance that combines a visual aspect of the equipment object and a visual aspect of the material object, and updating the game image so as to make the material object placed in the game field disappear and change the equipment object to the unified equipment object so that the player character is equipped with the unified equipment object.

32. A game process method executable on an information processing system, the method comprising:

generating, for display on a display device, a game image including a virtual game field in which a player character controllable by a player is placed; and when a unification instruction is given by the player while the player character is equipped with an equipment object and a material object is placed in the game field, generating a unified equipment object based on the equipment object and the material object placed, the unified equipment object having a player-perceivable appearance that combines a visual aspect of the equipment object and a visual aspect of the material object, and updating the game image so as to make the material object placed in the game field disappear and change the equipment object to the unified equipment object so that the player character is equipped with the unified equipment object.

* * * * *